(12) United States Patent
Adrezin et al.

(10) Patent No.: US 11,193,526 B1
(45) Date of Patent: Dec. 7, 2021

(54) COMPLIANT SHAFT ENCLOSURE SUPPORT SYSTEM TO LIMIT ROTATION

(71) Applicant: The Government of the United States of America, as represented by the Secretary of Homeland Security, Washington, DC (US)

(72) Inventors: Ronald Adrezin, East Lyme, CT (US); Michael Daeffler, Washington, DC (US); Michael F. Derrico, Washington, DC (US); Mary Shalane Regan, Groton, CT (US); Matthew K. Mothander, Washington, DC (US); Ryan R. Young, Washington, DC (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/223,898

(22) Filed: Apr. 6, 2021

Related U.S. Application Data

(60) Provisional application No. 63/107,988, filed on Oct. 30, 2020.

(51) Int. Cl.
*F16C 7/06* (2006.01)
*F16C 3/02* (2006.01)
*F16C 3/03* (2006.01)
*B63H 23/34* (2006.01)

(52) U.S. Cl.
CPC .............. *F16C 7/06* (2013.01); *F16C 3/02* (2013.01); *F16C 3/03* (2013.01); *B63H 23/34* (2013.01)

(58) Field of Classification Search
CPC ...... F16C 3/02; F16C 3/03; F16C 7/06; F16D 3/06; B63H 23/34; B63H 2023/342
See application file for complete search history.

(56) References Cited

U.S. PATENT DOCUMENTS

| 4,907,992 | A | | 3/1990 | Cavallaro et al. |
| 5,902,186 | A | * | 5/1999 | Gaukel ................. F16F 15/126 464/162 |
| 7,207,854 | B1 | * | 4/2007 | Anderson, Jr. ........ B63H 5/125 440/53 |
| 10,274,130 | B2 | * | 4/2019 | Balasubramanya ... F16M 11/14 |

* cited by examiner

*Primary Examiner* — Adam D Rogers
(74) *Attorney, Agent, or Firm* — Lavanya Ratnam; Kelly G. Hyndman; Robert W. Busby

(57) ABSTRACT

In an example, a compliant shaft enclosure support system for coupling to a shaft enclosure surrounding a shaft includes a bar having a first member slidably coupled to a second member. The bar is oriented along the pitch axis of the shaft. A first bar end of the bar is rotatably connected, around the roll axis and pitch axis of the shaft, to the shaft enclosure at a first connection. A second bar end of the bar is rotatably connected, around the roll axis and pitch axis, to the structure at a second connection. A link is rotatably connected, around the roll axis, at a first link end to the bar, at an intermediate location spaced from the first and second bar ends. The link is rotatably connected, around the pitch axis, at a second link end to the shaft enclosure at a third connection spaced from the first connection.

20 Claims, 16 Drawing Sheets

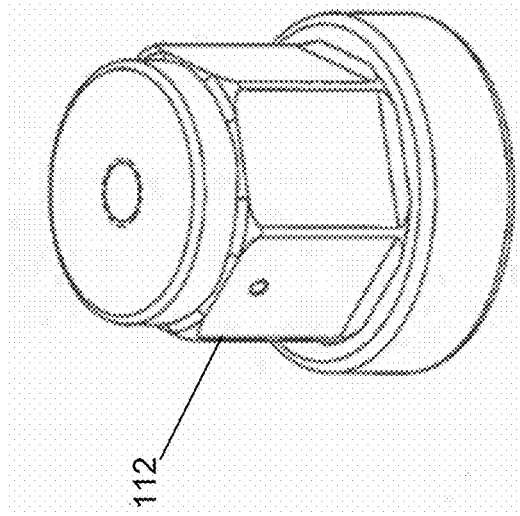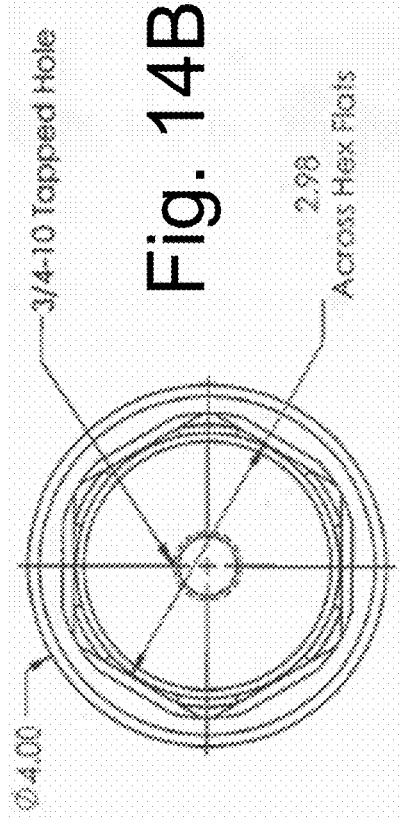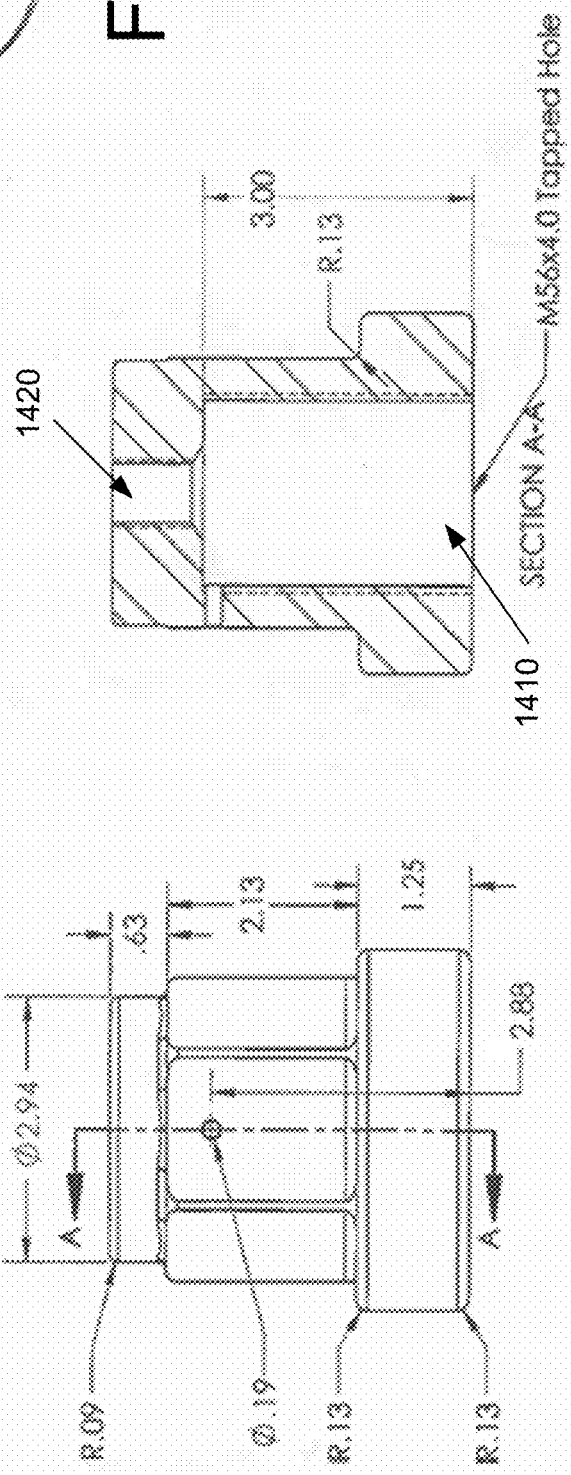
Fig. 14A
Fig. 14B
Fig. 14C
Fig. 14D

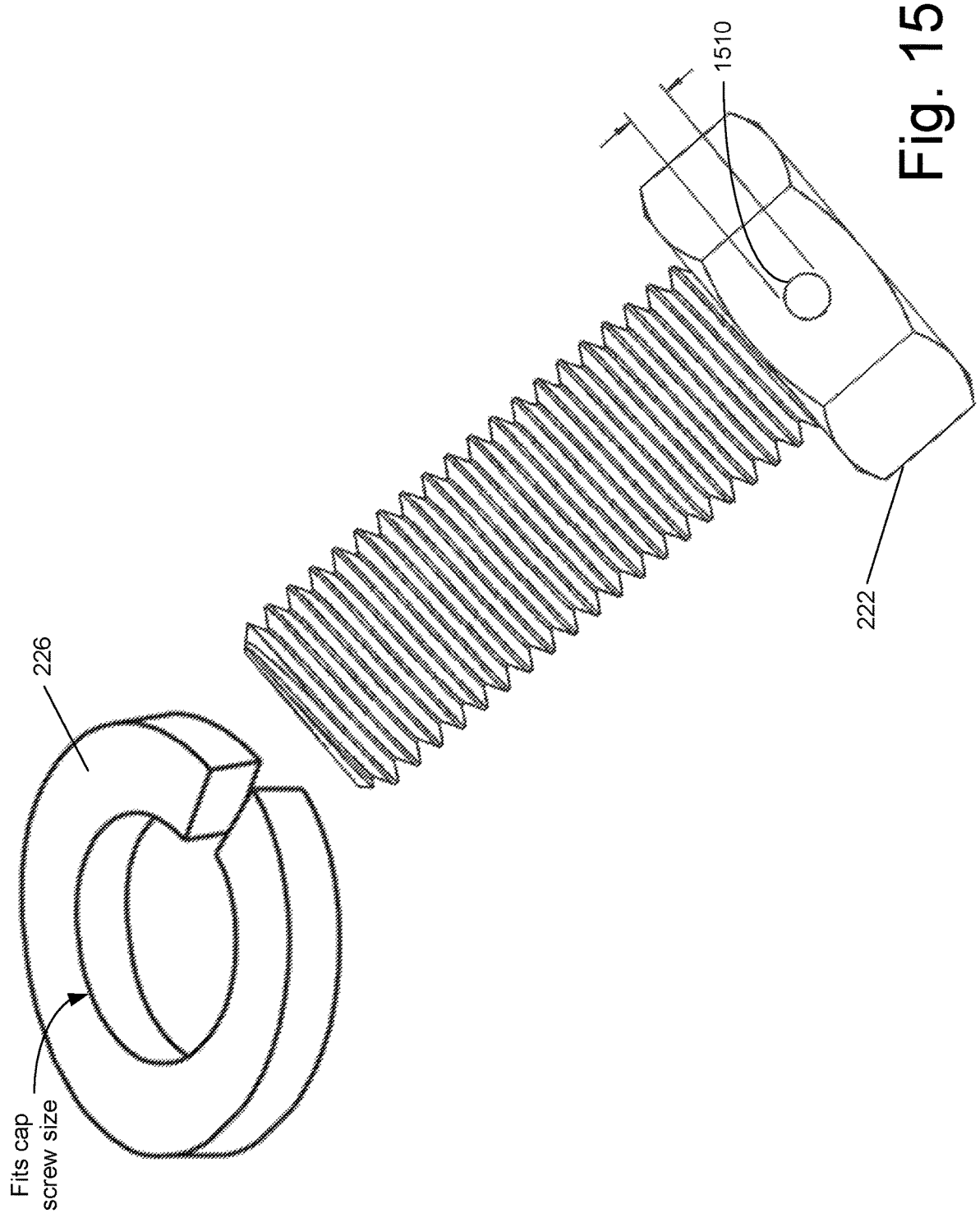

COMPLIANT SHAFT ENCLOSURE SUPPORT SYSTEM TO LIMIT ROTATION

CROSS-REFERENCE TO RELATED APPLICATIONS

The Applications claims the benefit of priority from and is a non-provisional of U.S. Provisional Patent Application No. 63/107,988, filed on Oct. 30, 2020, entitled COMPLIANT SHAFT ENCLOSURE SUPPORT SYSTEM, the disclosure of which is incorporated by reference in its entirety.

STATEMENT OF GOVERNMENT INTEREST

The present invention was made by employees of the United States Department of Homeland Security in the performance of their official duties. The U.S. Government has certain rights in this invention.

FIELD

The discussion below relates generally to rotation limiting systems and methods and, more particularly, to compliant shaft enclosure support system and method for limiting rotation of a shaft enclosure for a shaft such as an oil distribution device for a propeller shaft or the like.

BACKGROUND

Anti-rotation mechanisms are useful in various apparatuses to reduce, limit, or minimize rotation of a particular component with respect to another component. An example is an oil distribution (OD) box surrounding a propeller shaft to provide lubrication. An anti-rotation device is used to prevent the OD box from rotating with the propeller shaft.

SUMMARY

A heavy-duty icebreaker has an oil OD box surrounding a propeller shaft to provide proper lubrication. A metal anti-rotation bar is pinned on one end to the OD box or shaft enclosure and on the other end to the hull or structure of the icebreaker vessel. This prevents the OD box or shaft enclosure from rotating with the shaft. When the icebreaker is breaking ice, the propeller chops up some of the ice and causes the propeller shaft to flex with large displacements due to heavy loads of up to a million pounds generated by the ice milling. This often causes failure of the anti-rotation bar requiring the icebreaker to be stopped for repair that may take approximately 8 hours.

Embodiments of the present invention are directed to apparatuses and methods for providing compliant shaft enclosure support that allows the OD box or shaft enclosure to displace without constraining the propeller shaft but limits or minimizes its rotation.

An aspect is directed to a compliant shaft enclosure support system for coupling to a shaft enclosure surrounding a shaft which is rotatable relative to a structure around a longitudinal axis of the shaft as a roll axis, the shaft being configured to roll around the roll axis, to pitch around a pitch axis perpendicular to the roll axis, and yaw around a yaw axis perpendicular to both the roll axis and the pitch axis. The compliant shaft enclosure support system comprises: a bar having a first longitudinal member slidably coupled to a second longitudinal member, the bar being oriented along the pitch axis of the shaft, the first longitudinal member having a first bar end of the bar configured to be rotatably connected to the shaft enclosure at a first connection to be rotatable relative to the shaft enclosure around the roll axis and around the pitch axis, the second longitudinal member having a second bar end of the bar configured to be rotatably connected to the structure at a second connection to be rotatable relative to the structure around the roll axis and around the pitch axis; and a link rotatably connected at a first link end to the bar to be rotatable relative to the bar around the roll axis, at an intermediate location spaced from the first bar end and from the second bar end of the bar, the link configured to be rotatably connected at a second link end to the shaft enclosure at a third connection to be rotatable relative to the shaft enclosure around the pitch axis, the third connection being spaced from the first connection.

Another aspect is directed to a compliant shaft enclosure support system for coupling to a shaft enclosure surrounding a shaft which is rotatable relative to a structure around a longitudinal axis of the shaft as a roll axis, the shaft being configured to roll around the roll axis, to pitch around a pitch axis perpendicular to the roll axis, and yaw around a yaw axis perpendicular to both the roll axis and the pitch axis. The compliant shaft enclosure support system comprises: a bar having a first longitudinal member slidably coupled to a second longitudinal member, the bar being oriented along the pitch axis of the shaft, the first longitudinal member having a first bar end of the bar, the second longitudinal member having a second bar end of the bar; a first connecting mechanism configured to rotatably connect the first bar end of the bar to the shaft enclosure at a first connection to be rotatable relative to the shaft enclosure around the roll axis and around the pitch axis; a second connecting mechanism configured to rotatably connect the second bar end of the bar to the structure at a second connection to be rotatable relative to the structure around the roll axis and around the pitch axis; and a third connecting mechanism configured to rotatably connect an intermediate location of the bar spaced from the first bar end and from the second bar end of the bar, to the shaft enclosure at a third connection, to be rotatable relative to the shaft enclosure around the roll axis and around the pitch axis, the third connection being spaced from the first connection.

Yet another aspect is directed to a method of for coupling to a shaft enclosure surrounding a shaft which is rotatable relative to a structure around a longitudinal axis of the shaft as a roll axis, the shaft being configured to roll around the roll axis, to pitch around a pitch axis perpendicular to the roll axis, and yaw around a yaw axis perpendicular to both the roll axis and the pitch axis. The method comprises: rotatably connecting a first bar end of a bar to the shaft enclosure at a first connection to be rotatable relative to the shaft enclosure around the roll axis and around the pitch axis; rotatably connecting a second bar end of the bar to the structure at a second connection to be rotatable relative to the structure around the roll axis and around the pitch axis, the bar having a first longitudinal member slidably coupled to a second longitudinal member, the bar being oriented along the pitch axis, the first longitudinal member having the first bar end of the bar, the second longitudinal member having the second bar end of the bar; and rotatably connecting an intermediate location of the bar spaced from the first bar end and from the second bar end of the bar, to the shaft enclosure at a third connection, to be rotatable relative to the shaft enclosure around the roll axis and around the pitch axis, the third connection being spaced from the first connection.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 14A shows a perspective view of the mounting nut of FIG. 13. FIG. 14B shows a top plan view thereof. FIG. 14C shows an elevational view thereof. FIG. 14D shows a cross-sectional view along section A-A thereof.

FIG. 15 shows an exploded perspective view of a wire-lockable cap screw and a split lock washer in the compliant shaft enclosure support system of FIG. 2.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Marine Controllable Pitch Propeller

Figure 1A:
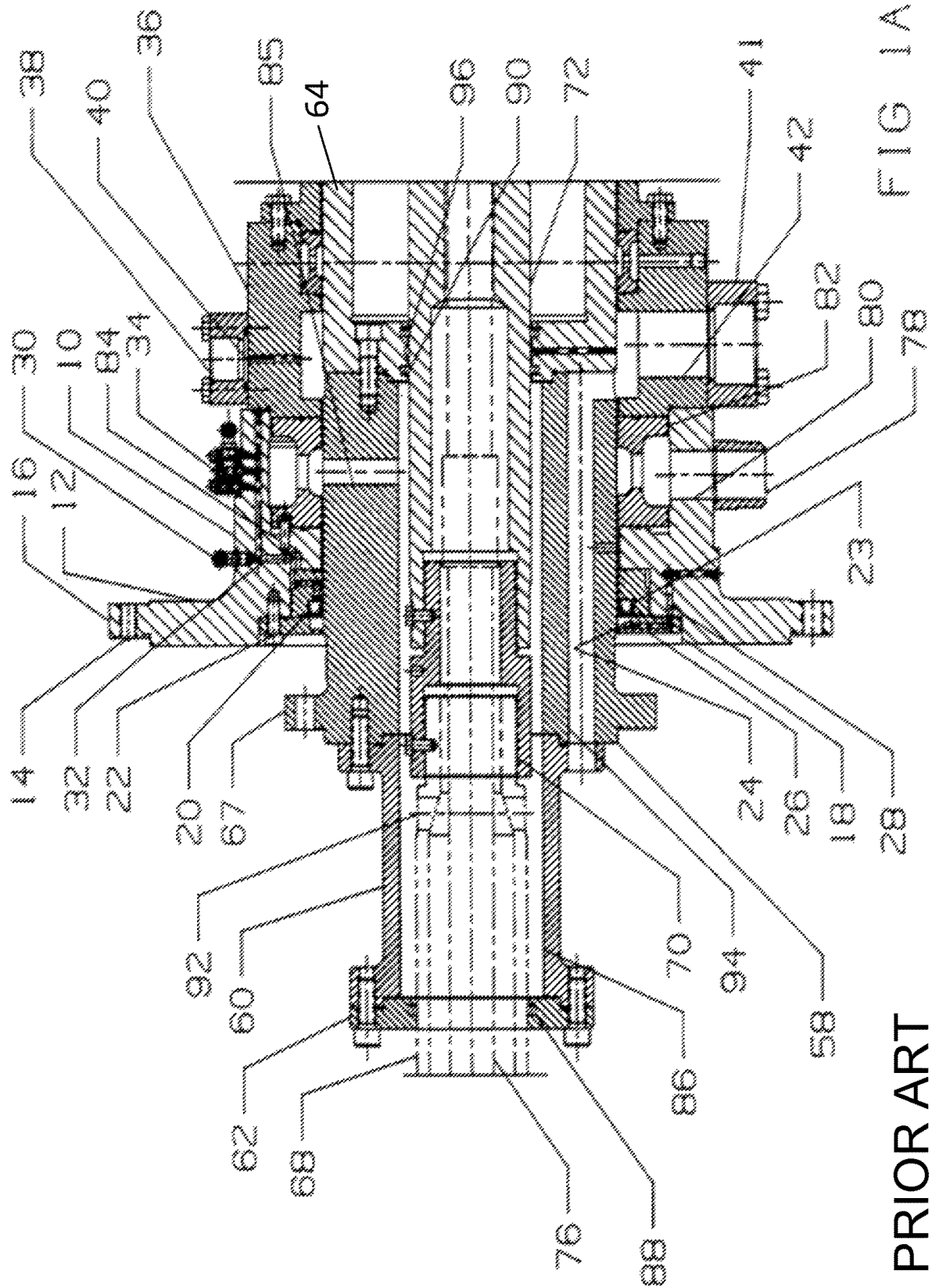
FIG. 1A is a cross-sectional view of an example of an oil distribution (OD) box for a marine controllable pitch propeller.

U.S. Pat. No. 4,907,992 discloses an example of an oil distribution (OD) box for a marine controllable pitch propeller (CPP) or variable pitch propeller. FIG. 1A is a cross-sectional view of an example of the OD box for a marine CCP. A housing 10 of the oil distribution (OD) box is built up from several ring-like components dowelled and bolted together end-to-end. At the aft end (the left side of FIG. 1A) is a flange component 12 having a mounting flange portion 16. Bolt holes 14 arranged in a circular row in the flange portion 16 to receive bolts (not shown) that fasten the OD box to the forward wall of the reduction gear casing (not shown). A recess 18 in the aft end face receives a lip seal assembly 20 fastened in place by cap screws 22. Any oil that leaks past the lip seal element 23 is picked up in a groove 24 in the seal element retainer 26 and drained off through a series of passages 28 for return to the oil reservoir of the CPP system hydraulics. The seal assembly 20 is pressurized by oil that leaks past the aft part of the journal clearance seal (82, described below) associated with the high pressure oil feed for the main servo in the propeller hub. The pressure on the seal assembly 20 is controlled by an unloading valve 34 connected through a fitting 30, a system of passages 32, and a line (not shown).

A return oil housing part 36 is dowelled and bolted to the forward end of the flange component 12. A flanged connection 38 on the top is connected to a head tank that supplies oil at all times, including full shutdown of the CPP system, to the oil return side of the main servo in the propeller hub through a passage 40. A flange connector 41 on the bottom of the housing part 36 is connected to the reservoir of the pump (not shown) of the CPP system hydraulics at the outer port opening of a passage 42 that communicates with the oil return side of the main servo in the propeller hub.

The housing 10 and the components associated with it are stationary. Running within the housing 10 is a rotating assembly that (1) provides a rotary joint for supply and return of oil between the main servo in the propeller hub and the CPP system hydraulics, (2) provides a rotary joint for supply and return oil for the auxiliary servo, which is mechanically connected to the valve spool of the main servo in the hub, thereby providing propeller pitch control from inboard, and (3) provides mechanical pitch-setting of the CPP for emergency take-home operation.

At the aft end of the rotating assembly of the OD box are an OD box shaft 58, a shaft extension 60, and a seal housing 62, and at the forward end are the cylinder member 64 and the cylinder head (not shown) of the auxiliary hydraulic servo. The aforementioned components are dowelled and bolted to each other to form a unit that is, in turn, bolted to the forward end of the output shaft (not shown) of the reduction gear box by means of a flange portion 67 on the OD box shaft 58. The aft end of the output shaft of the gear box is coupled to the propeller shaft. The shaft and servo chamber unit of the OD box are axially stationary.

A valve rod 68 that controls the valve spool of the main servo directional valve in the propeller hub runs the full length of the propeller shaft and through the output gear shaft of the reduction gear box and extends a short distance into the shaft extension 60 where it is connected by a length-adjusting turnbuckle coupling tube 70 to the piston rod 72 of the auxiliary servo piston (not shown). As described in more detail below, the valve rod 68, piston rod 72 and piston rotate with the propeller and propeller shafting and move axially along a stroke distance equal to that of the main servo in the propeller hub in normal operation and somewhat greater than that of the main servo and pitch control mechanism of the propeller during emergency take-home operation.

For military applications, there is a prairie air system. A prairie air tube 76 runs forward from the propeller within the valve rod, passes through the OD box within the piston rod 72, and extends forward to a rotary joint (not shown) forward of the OD box to receive air from the prairie air supply. In non-military applications the prairie air tube 76 will be omitted. The prairie air tube plays no role in the essential functions of the OD box or the CPP system.

High pressure oil for the hub and blade assembly is supplied to the OD box by the CPP system hydraulics through a line (not shown) coupled to a fitting 78 on the aft or flange component 12 of the housing 10 and passes through a passage 80 in the aft component to a journal clearance seal 82 mounted within the aft component and loosely held against rotation by a pin 84. The seal 82 is in a sliding fit with the housing components 12 and 36, and the OD box shaft runs within the sealing faces of the seal 82, which floats on an oil film. Leakage aftward past the seal 82 is stopped by the lip seal assembly 20, and any over-pressure due to leakage is released through the unloading valve 34. Oil that leaks forward past the seal 82 is returned to the pump reservoir through the return passage 42.

Radial passages 85 through the OD box shaft 58 provide a path or high pressure oil to an annular supply chamber 86 defined by the inner walls of the shaft 58 and shaft extension 60 and the outer walls of the valve rod 68 and piston rod 72 and by an aft seal 88 carried by the seal mount 62 and a forward seal 90 carried by the cylinder member 64 of the OD box auxiliary servo. The annular chamber 86 allows the valve rod to move axially and receive oil through passages 92 throughout its operating stroke. The high pressure oil for operating the main pitch-control servo is conducted aft to the hub in the annulus between the valve rod 68 and the prairie air tube. In CPP systems without a prairie air system the high pressure oil supply to the main servo is simply through the valve rod.

Return oil from the main servo in the propeller hub passes through the annulus between the valve rod and the propeller shaft. Lengthwise passages 94 in the OD box shaft 58 conduct the return oil to the discharge passage 42, from which it is returned to the pump reservoir.

The piston rod 72 is sealed by an aft seal 96 to the cylinder member or chamber 64 and a forward seal to the cylinder head. Because the shaft and servo chamber unit rotates with the valve rod and piston unit of the OD box, the forward seal and aft seal 96 can hold very high pressures, which, as described below, is essential for emergency take-home operation of the CPP system. The piston rod 72 has a uniform outer diameter along its length and extends forwardly out through the cylinder head to prevent pressure surges when the valve rod and piston unit moves axially during a pitch change. The outwardly-protruding forward end portion of the piston rod 72 also provides pitch-position indication in the form of its axial position.

EMBODIMENTS

Figure 1B:
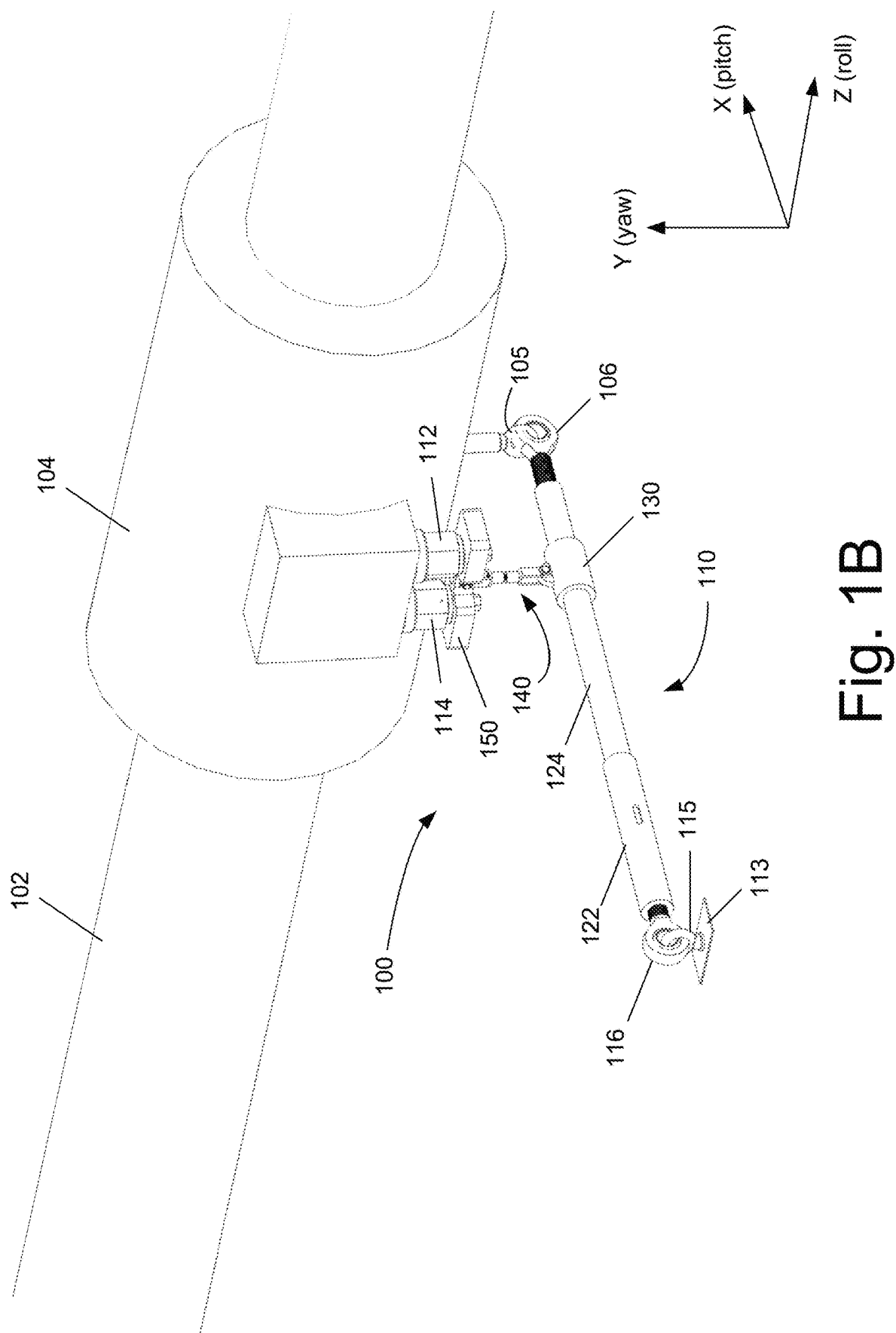
FIG. 1B is a perspective view of a compliant shaft enclosure support system coupled to an OD box according to an embodiment.

FIG. 1B is a perspective view of a compliant shaft enclosure support system 100 coupled to an OD box for a propeller shaft or shaft 102 according to an embodiment. The propeller shaft 102 is driven to rotate around a longitudinal axis which is generally parallel to the Z-axis which is the roll axis of the propeller shaft 102. The OD box 104 is a shaft enclosure that surrounds the propeller shaft 102. The propeller shaft 102 is configured to roll around the roll axis (Z), to pitch around a pitch axis (X) perpendicular to the roll axis, and yaw around a yaw axis (Y) perpendicular to both the roll axis and the pitch axis.

The compliant shaft enclosure support system 100 may be attached to the OD box 104 at an OD box clevis 105 via a first connecting mechanism in the form of a first large bore series male bar end or first bar end 106 which is attached to a distal end of an anti-rotation bar or main bar 110. The compliant shaft enclosure support system 100 may be attached by a second connecting mechanism to the hull or structure 113 of the vessel at a hull clevis 115 via a second large bore series male bar end or second bar end 116 which is attached to a proximal end of the anti-rotation bar 110. The compliant shaft enclosure support system 100 may be attached to the OD box 104 at another location spaced from the OD box clevis 105 via a third connecting mechanism including a pair of mounting nuts 112, 114 which is connected to the anti-rotation bar 110 at a location between the first bar end 106 and the second bar end 116.

In this example, the anti-rotation bar 110 includes a female member or female longitudinal member 122 and a male member or male longitudinal member 124 which are slidably coupled to one another in a direction generally parallel to the X-axis which is the pitch axis of the propeller shaft 102. When the anti-rotation bar 110 is attached to the OD box 104 by the first connecting mechanism at the first bar end 106 and by the third connecting mechanism at a location on the male member 124 between the first bar end 106 and the second bar end 116, the anti-rotation bar 110 (generally parallel to the X-axis) is generally perpendicular to the propeller shaft 102 (generally parallel to the Z-axis).

In this example, the third connecting mechanism includes the pair of mounting nuts 112, 114 that are used to mount one end of a link to the OD box 104. The other end of the link includes a padeye collar 130 which is connected to the male member 124 at a location between the first bar end 106 and the second bar end 116. The padeye collar 130 may be disposed around and slidably coupled to the male member 124 of the anti-rotation bar 110. One example of the link includes a turnbuckle 140 that is connected at one end to the padeye collar 130 and at another end to a spectacle plate 150 on which the pair of mounting nuts 112, 114 are attached to mount the spectacle plate 150 to the OD box 104.

FIG. 1B shows an example of the first connecting mechanism for connecting the male member 124 of the anti-rotation bar 110 to the OD box clevis 105 of the OD box 104 via the first bar end 106 and an example of the second connecting mechanism for connecting the female member 122 of the anti-rotation bar 110 to the hull clevis 115 of the hull 113 via the second bar end 116. The third connecting mechanism may connect the padeye collar 130 on the male member 124 of the anti-rotation bar 110 and the OD box 104 via the mounting nuts 112, 114, turnbuckle 140, and spectacle plate 150.

As such, the anti-rotation bar 110 has a first longitudinal member (e.g., female member 122) slidably coupled to a second longitudinal member (e.g., male member 124). The bar 110 is oriented along the pitch axis (X) of the shaft 102. The first longitudinal member 122 has a first bar end 106 of the bar configured to be rotatably connected to the shaft enclosure 104 at a first connection (with shaft enclosure clevis 105) to be rotatable relative to the shaft enclosure 104 around the roll axis (Z) and around the pitch axis (X). The second longitudinal member 124 has a second bar end 116 of the bar configured to be rotatably connected to the structure 113 at a second connection (with structure clevis 115) to be rotatable relative to the structure 113 around the roll axis (Z) and around the pitch axis (X). A link (e.g., turnbuckle 140, padeye collar 130, spectacle plate 150, and mounting nuts 112, 114) may be rotatably connected at a first link end to the bar 110 to be rotatable relative to the bar around the roll axis (Z), at an intermediate location spaced from the first bar end 106 and from the second bar end 116 of the bar 110. The link may be configured to be rotatably connected at a second link end to the shaft enclosure 104 at a third connection (via mounting nuts 112, 114 using mounting bolts) to be rotatable relative to the shaft enclosure 104 around the pitch axis (X), the third connection being spaced from the first connection.

Figure 2:
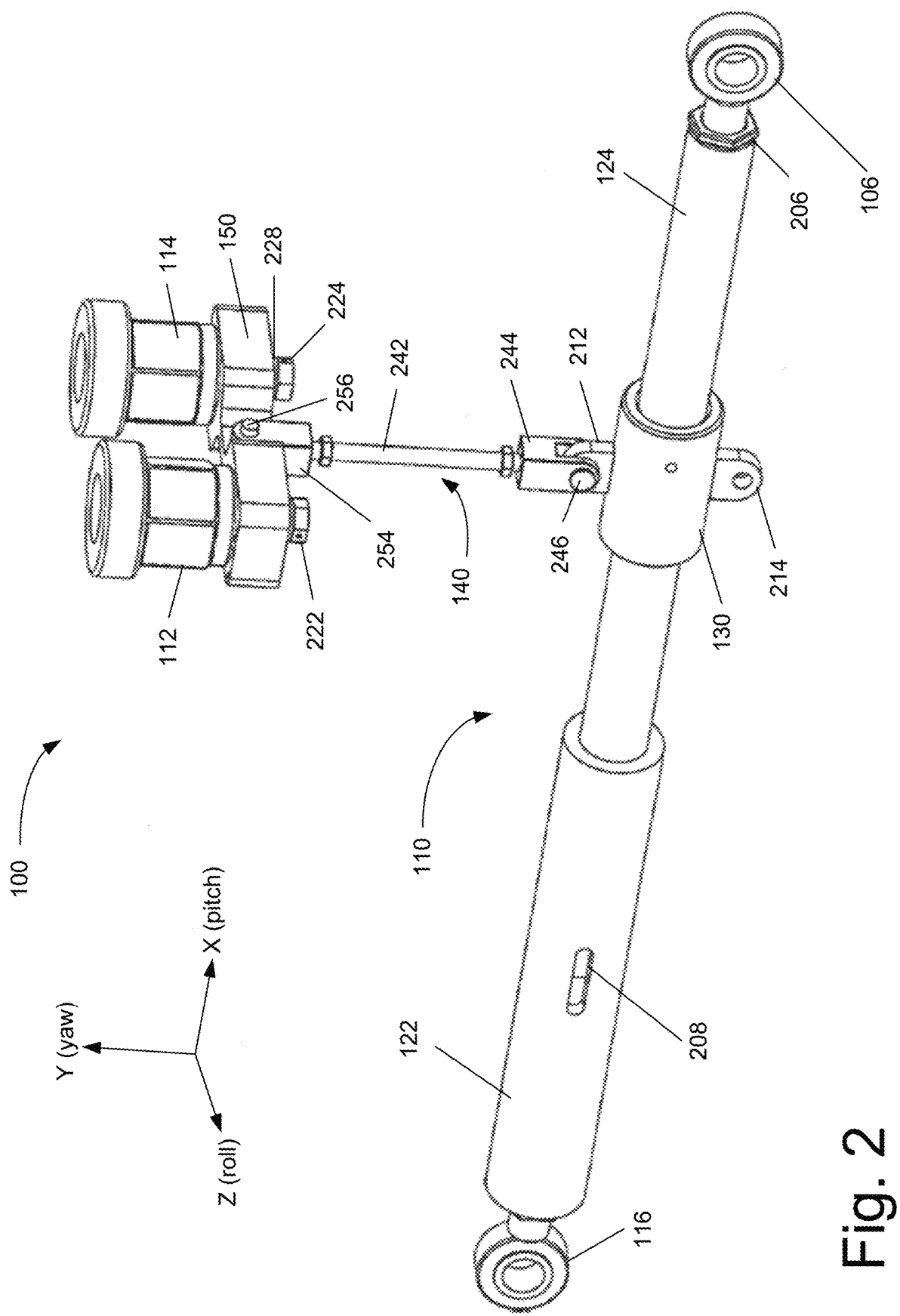
FIG. 2 is a perspective view of a compliant shaft enclosure support system according to an embodiment.
Figure 3:
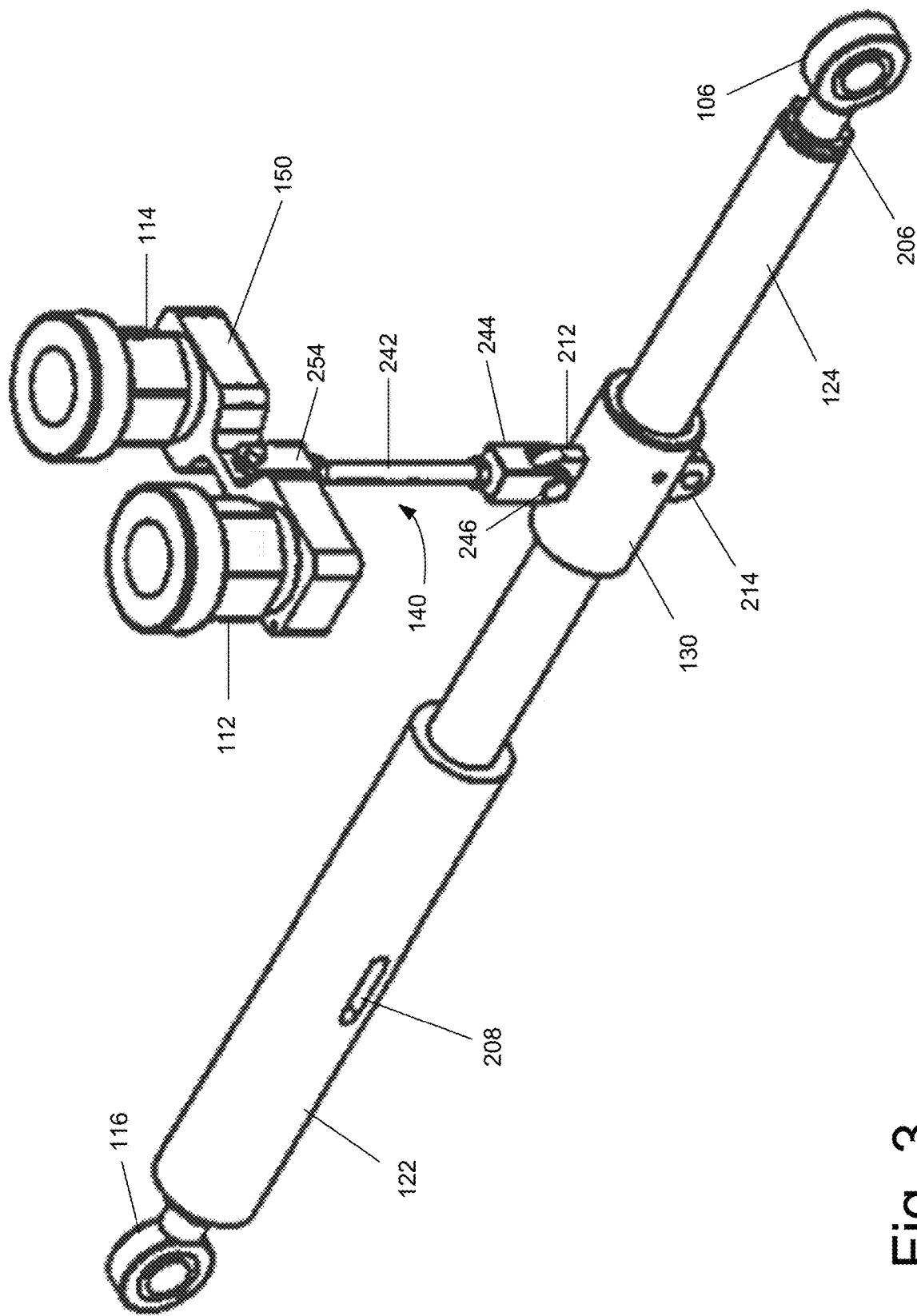
FIG. 3 is another perspective view of the compliant shaft enclosure support system of FIG. 2.
Figure 4:
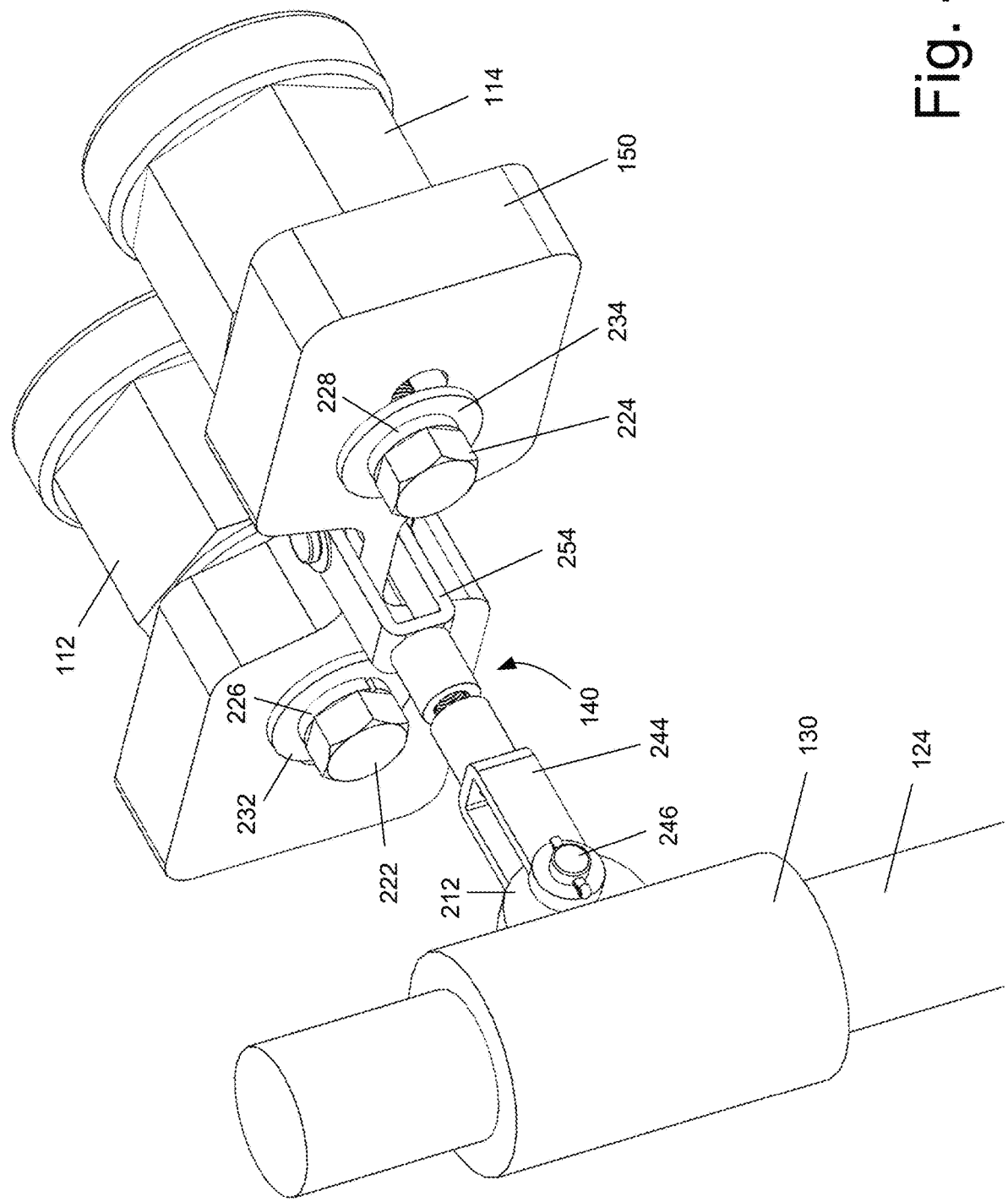
FIG. 4 is another perspective view of the compliant shaft enclosure support system of FIG. 2.
Figure 5:
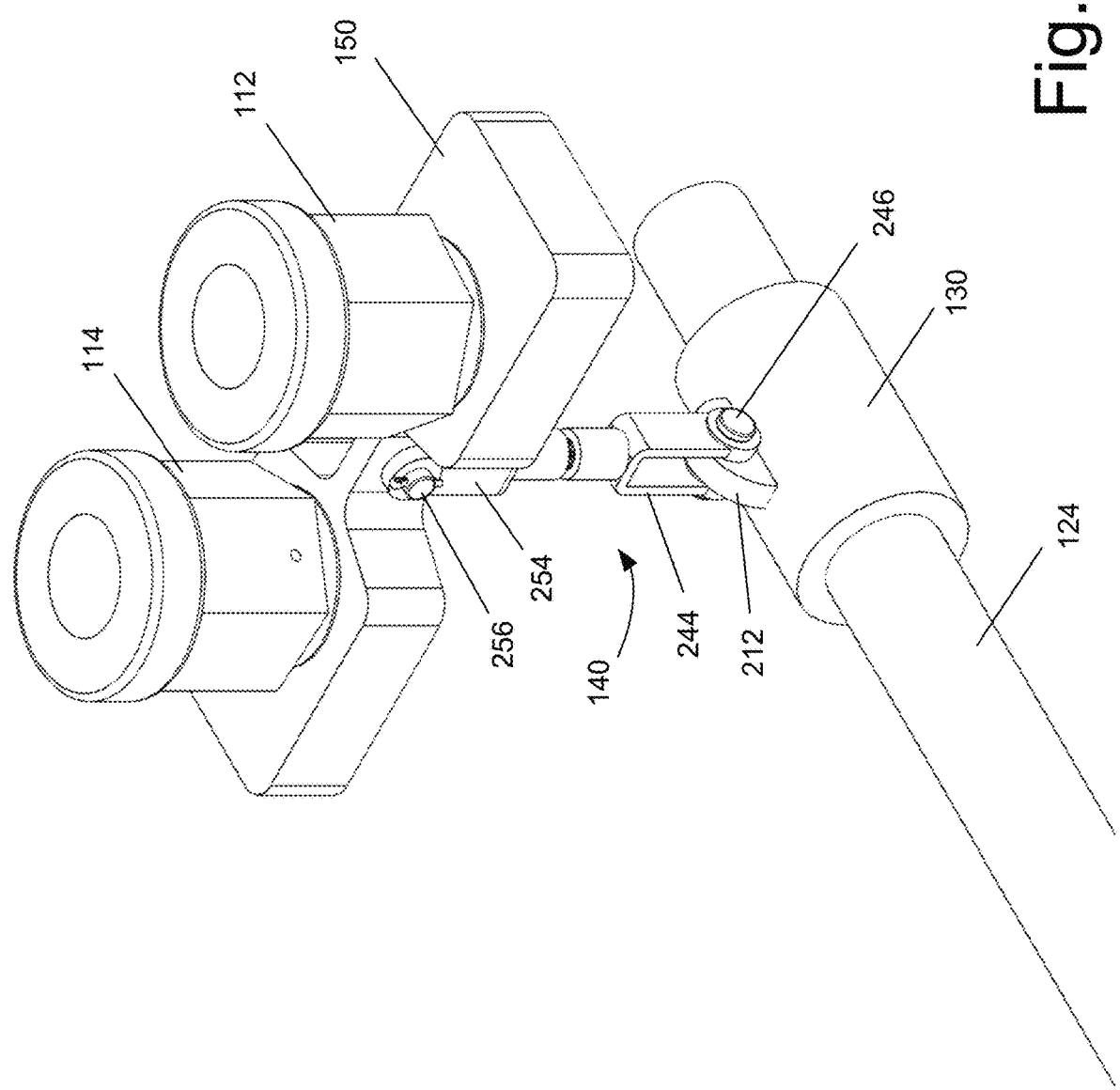
FIG. 5 is another perspective view of the compliant shaft enclosure support system of FIG. 2.
Figure 6:
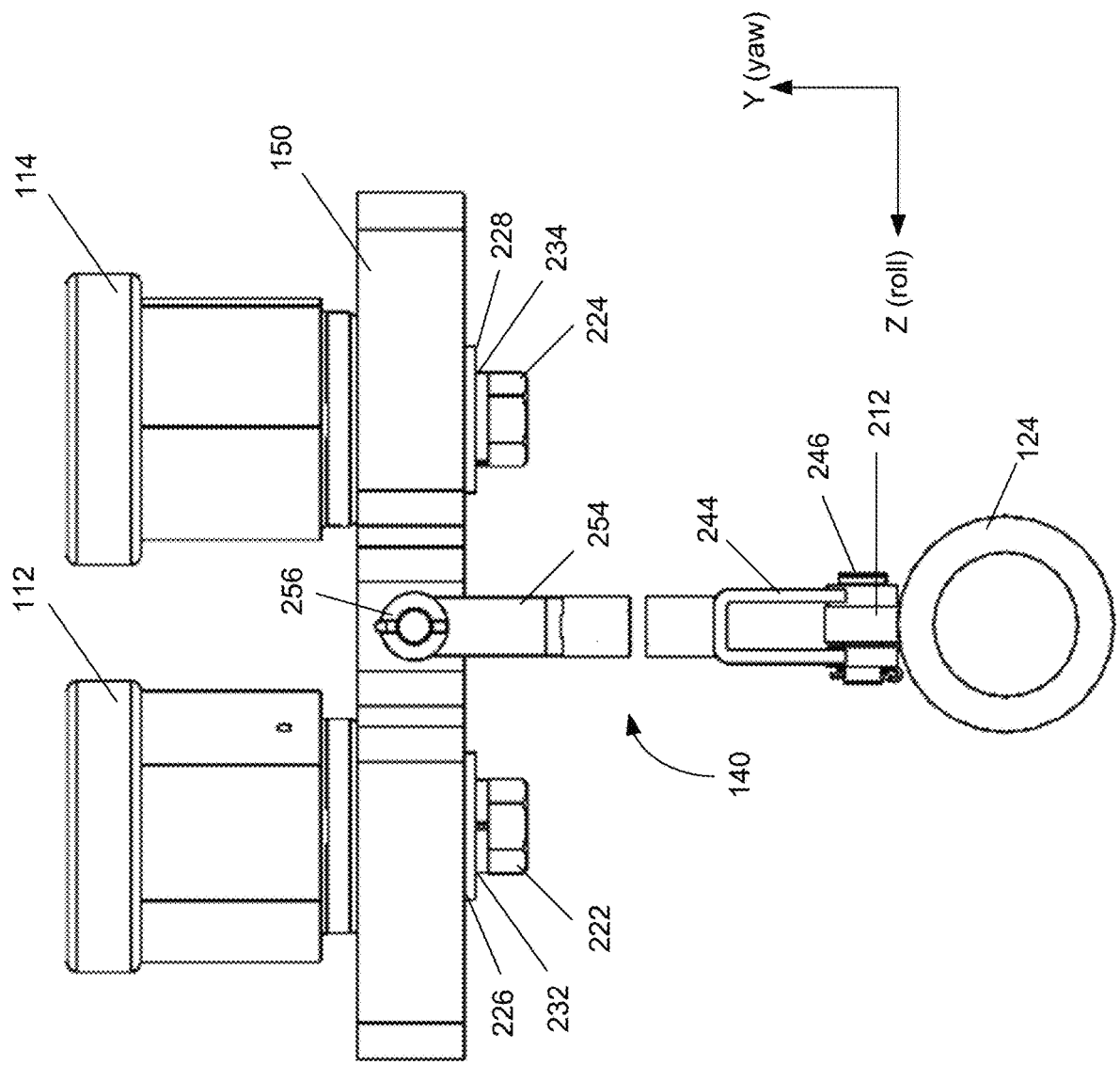
FIG. 6 is a side elevational view of the compliant shaft enclosure support system of FIG. 2.
Figure 7:
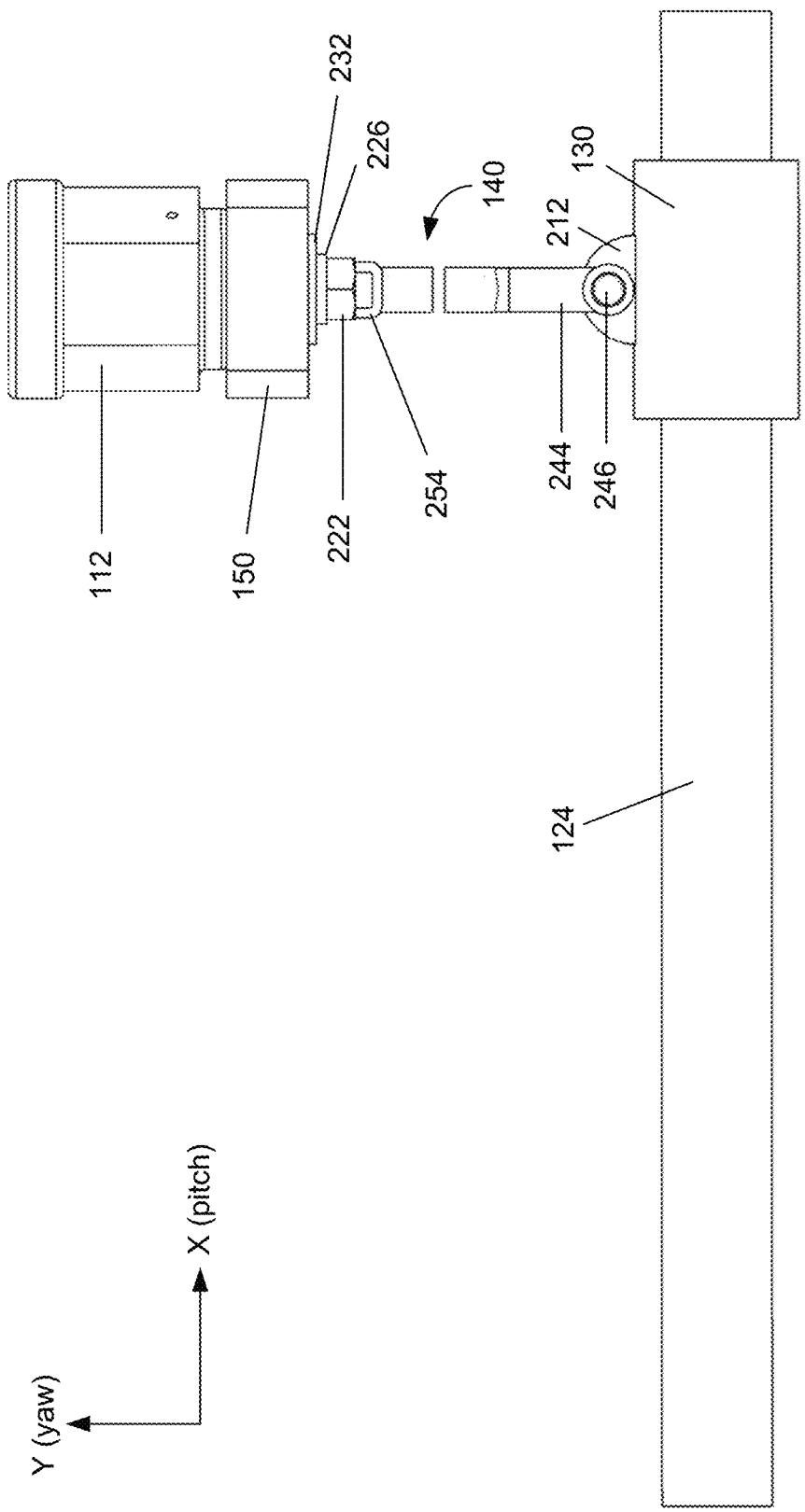
FIG. 7 is a front elevational view of the compliant shaft enclosure support system of FIG. 2.

FIG. 2 is a perspective view of a compliant shaft enclosure support system according to an embodiment. FIG. 3 is another perspective view thereof. FIG. 4 is another perspective view thereof. FIG. 5 is another perspective view thereof. FIG. 6 is a side elevational view thereof. FIG. 7 is a front elevational view thereof.

The attachments via the large bore series male bar ends (106, 116) at the two ends of the anti-rotation bar 110 provide rotational connections of the anti-rotation bar 110 to the OD box 104 and the hull 113 around the Z-axis. For attachment of the anti-rotation bar 110 to the OD box 104 and the hull 113 at the two ends, a thin hex nut 206 may be used in conjunction with each large bore series male bar end (first bar end or box end 106 and second bar end or hull end 116). The female member 122 may include a slot 208 to provide heat dissipation and/or pressure release to prevent temperature and/or pressure buildup.

In this example, the padeye collar 130 is disposed around the male member 124 of the anti-rotation bar 110 and has one or more padeyes (212, 214) attached thereto. The padeye collar 130 may be connected via the turnbuckle 140 in the third connecting mechanism for attaching to the OD box 104 via the pair of mounting nuts 112, 114. The turnbuckle 140 may be oriented generally parallel to the Y-axis which is the yaw axis of the propeller shaft 102. The padeye collar 130 is initially slidable relative to the male member 124 (generally parallel to the X-axis) so as to adjust its position as part of the third connecting mechanism with respect to the attachment to the OD box 104 at the mounting nuts 112, 114. Once a desirable or optimal position is determined to achieve a desirable or optimal connection of the padeye collar 130 on the male member 124 via the third connecting mechanism to the OD box 104, the padeye collar 130 can be fastened or affixed to the male member 124 by welding or the like to fix its position on the anti-rotation bar 110.

To fix the position of the padeye collar 130 on the bar 110, the process may include connecting the padeye collar 130 to the intermediate location of the bar 110 to be slidable along the bar in a direction of the pitch axis (X) and rotatable relative to the bar around the pitch axis (X), rotatably connecting the first turnbuckle end to the padeye collar 130 to be rotatable around the roll axis (X) by less than about 20°, adjusting a length of the turnbuckle 140 between the first turnbuckle end and the second turnbuckle end, adjusting the intermediate location of the bar 110 to which the padeye collar 130 is connected, and affixing the padeye collar 130 to the bar 110 at the adjusted intermediate location at the adjusted length of the turnbuckle 140.

In this example, the third connecting mechanism to the OD box 104 includes the pair of mounting nuts 112, 114 to be attached via a pair of mounting bolts to a pair of apertures at the OD box 104. In one embodiment, the mounting nuts 112, 114 are custom M56×3.0 nuts that are attached to a pair of openings in a spectacle plate 150 via a pair of fasteners such as wire-lockable cap screws 222, 224 with a pair of split lock washers 226, 228 and a pair of washers 232, 234, as best seen in FIG. 4. The locations of the pair of mounting nuts 112, 114 on the spectacle plate 150 are arranged along a direction generally parallel to the Z-axis.

The third connecting mechanism further includes the turnbuckle 140 connected at one end to the male member 124 of the anti-rotation bar 110 via the padeye 212 on the padeye collar 130 and at the other end to the spectacle plate 150 at a location between the pair of mounting nuts 112, 114. The turnbuckle 140 includes a threaded rod 242 oriented generally parallel to the Y-axis, which is the yaw axis of the propeller shaft 102. The threaded rod 242 is attached to the padeye 212 via a first starboard and port clevis or first turnbuckle clevis 244 by a first turnbuckle clevis pin 246 that are rotatably coupled to be rotatable generally around the Z-axis which is the roll axis for the propeller shaft 102. As such, the threaded rod 242 is rotatably connected to the padeye 212 and thus the anti-rotation bar 110 in roll rotation. The threaded rod 242 is attached to the spectacle plate 150 via a second turnbuckle clevis 254 by a second turnbuckle clevis pin 256 that are rotatably coupled to be rotatable generally around the X-axis which is the pitch axis of the propeller shaft 102. As such, the threaded rod 242 is rotatably connected to the spectacle plate 150 and hence the OD box 104 in pitch rotation.

By using the turnbuckle 140 instead of a simple rod, it is possible to adjust the relative positions (translational and angular) between the two turnbuckle devises (244, 254) at opposite ends of the turnbuckle 140 to match the relative positions between the spectacle plate 150 and the padeye collar 130 to achieve a desirable or optimal connection of the male member 124 of the anti-rotation bar 110 via the third connecting mechanism to the OD box 104. The adjustability of the position of the padeye collar 130 along the male member 124 of the anti-rotation bar 110 and of the relative positions between the turnbuckle devises 244, 254 of the turnbuckle 140 contributes to allow the compliant shaft enclosure support system 100 to be adaptable to variations in dimensions and spacings in the propeller shaft 102 and OD box 104. These components are also configured to allow installation and adjustments of the compliant shaft enclosure support system 100 to be made in a tight space.

Figure 8B:
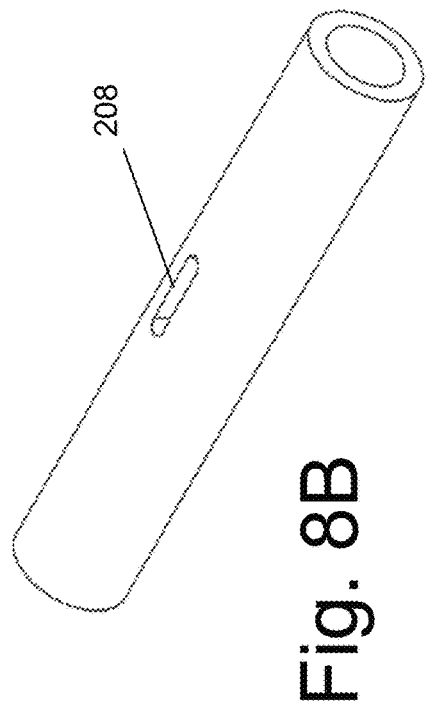
FIG. 8B shows another perspective view thereof.
Figure 8C:
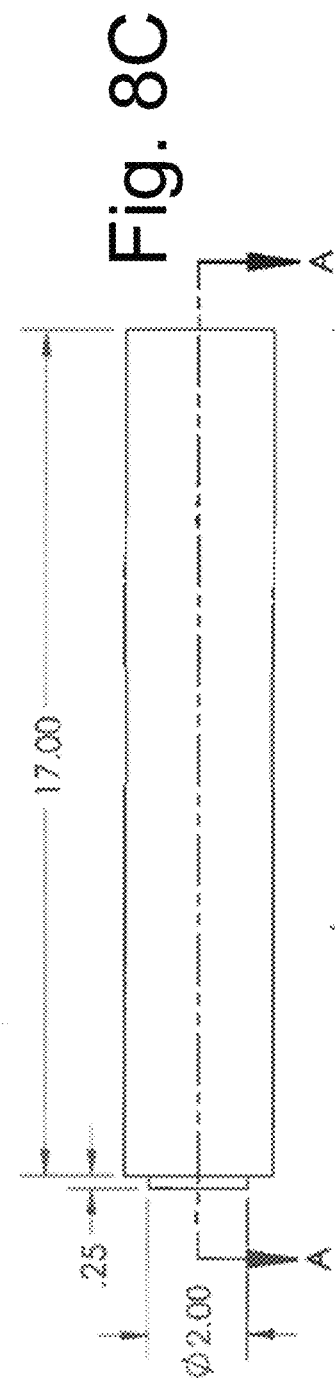
FIG. 8C shows an elevational view thereof.
Figure 8D:
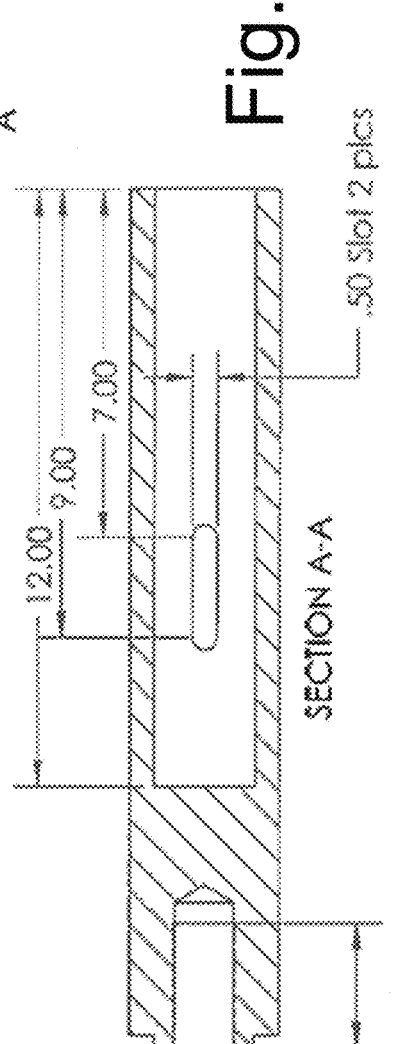
FIG. 8D shows a cross-sectional view along section A-A thereof.
Figure 8A:
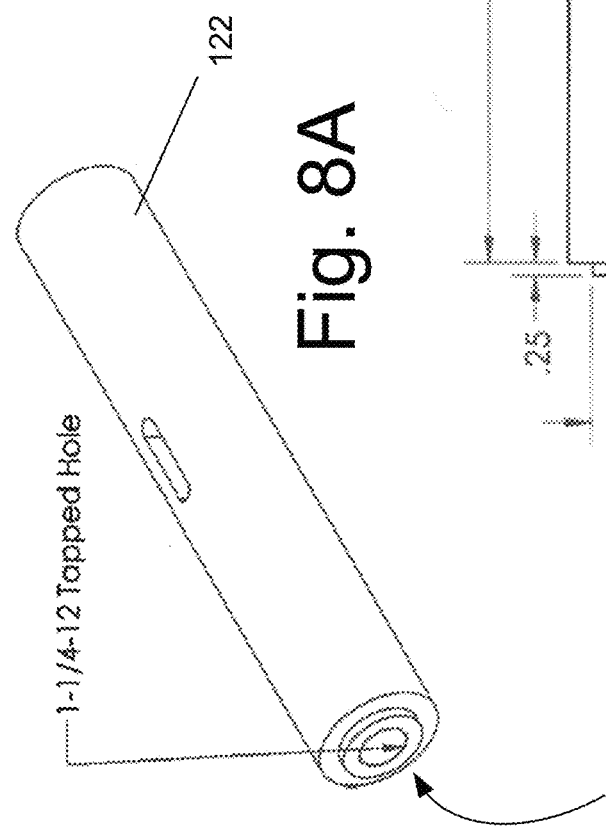
FIG. 8A shows a perspective view of a female member of the anti-rotation bar in the compliant shaft enclosure support system of FIG. 2.

FIG. 8A shows a perspective view of a female member 122 of the anti-rotation bar in the compliant shaft enclosure support system 100 of FIG. 2. FIG. 8B shows another perspective view thereof. FIG. 8C shows an elevational view thereof. FIG. 8D shows a cross-sectional view along section A-A thereof. One end 810 of the female member 122 (which is the proximal end of the anti-rotation bar 110) is configured to be attached to the second large bore series male bar end 116. The other open end is configured to slidably receive the male member 124. The slot is a longitudinal slot 208 that extends into the cavity of the open end for slidably receiving the male member 124.

Figure 9:
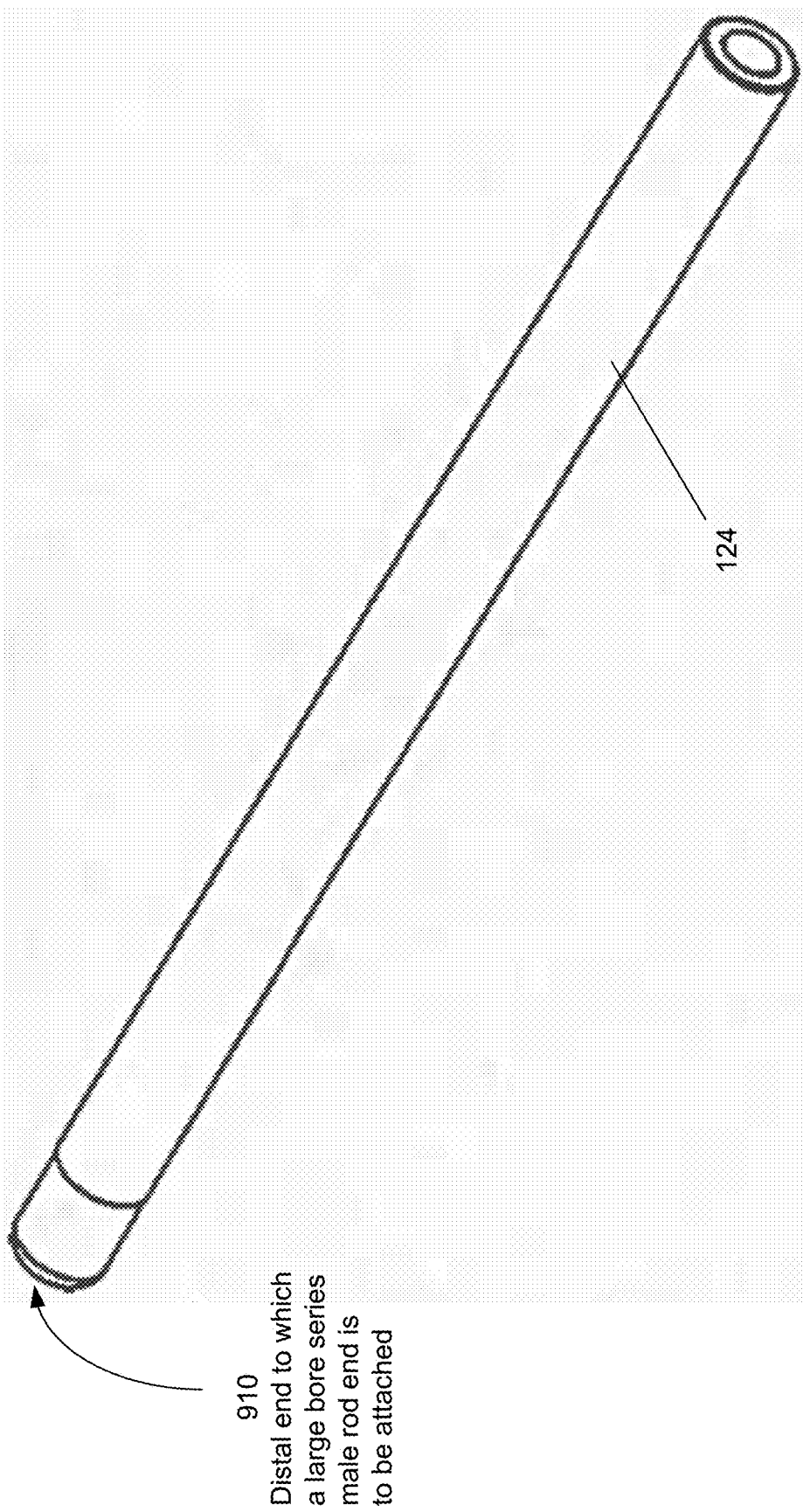
FIG. 9 is a perspective view of a male member of the anti-rotation bar in the compliant shaft enclosure support system of FIG. 2.

FIG. 9 is a perspective view of a male member 124 of the anti-rotation bar 110 in the compliant shaft enclosure support system 100 of FIG. 2. One open end of the male member 124 is configured to be slidably received by the female member 122. The other end 910 of the male member 124 (which is the distal end of the anti-rotation bar 110) is configured to be attached to the first large bore series male bar end 106.

Figure 10B:
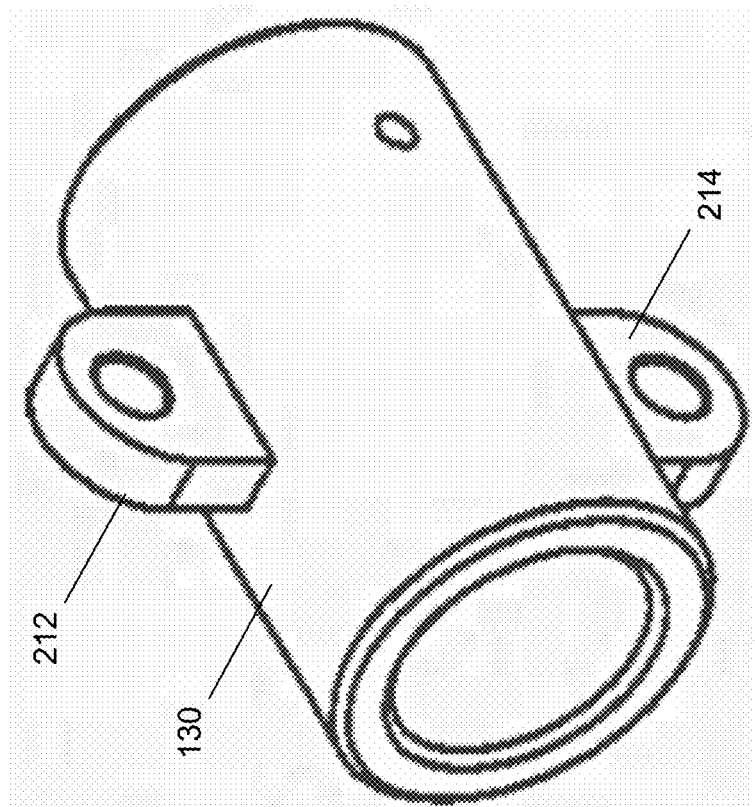
FIG. 10B shows a perspective view of the padeye collar with two padeyes attached thereto.
Figure 10A:
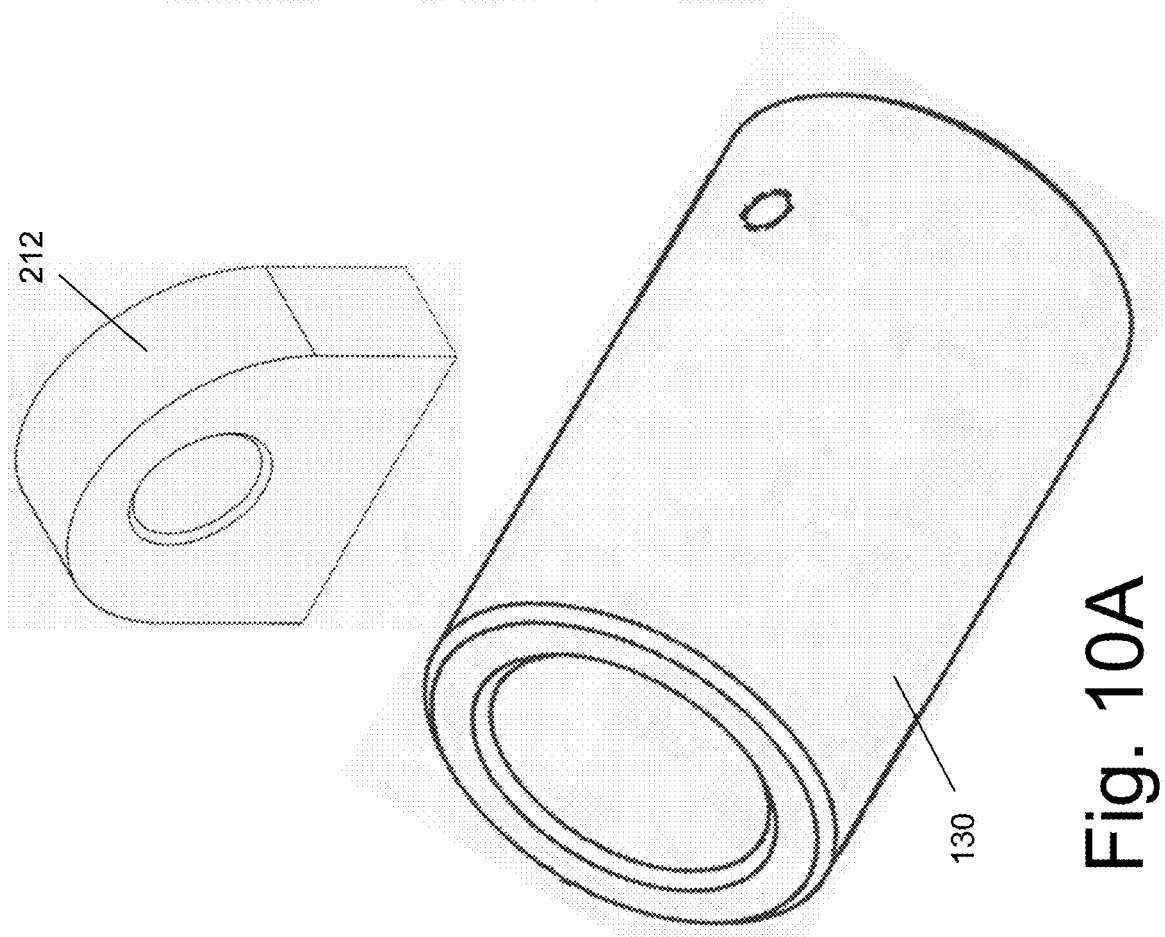
FIG. 10A shows an exploded view of a padeye and a padeye collar in the compliant shaft enclosure support system of FIG. 2.

FIG. 10A shows an exploded view of a padeye 212 and a padeye collar 130 in the compliant shaft enclosure support system 100 of FIG. 2. FIG. 10B shows a perspective view of the padeye collar 130 with two padeyes 212, 214 attached thereto. Only one padeye is needed. A second padeye may be provided as a spare if the first padeye is damaged or fails for any reason.

Figure 11:
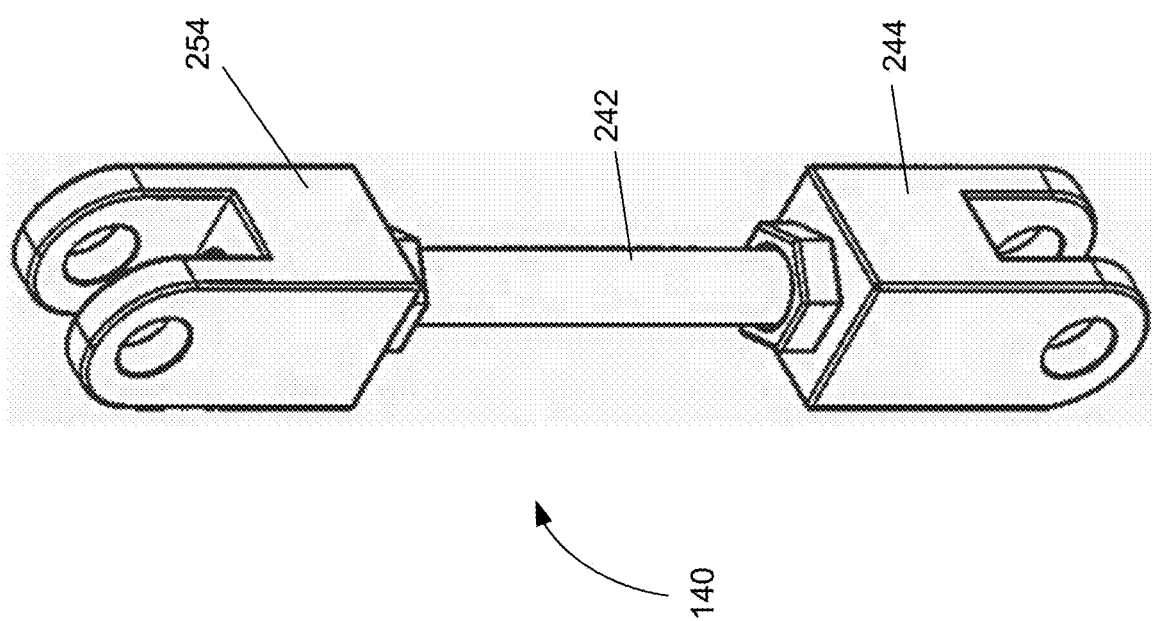
FIG. 11 is a perspective view of a turnbuckle in the compliant shaft enclosure support system of FIG. 2.

FIG. 11 is a perspective view of a turnbuckle 140 in the compliant shaft enclosure support system 100 of FIG. 2. The turnbuckle 140 includes the threaded rod 242 threadingly connected between the first turnbuckle clevis 244 and the second turnbuckle clevis 254. The threaded connections allow adjustment of the relative positions (translational and angular) between the padeye collar 130 and the spectacle plate 150.

Figure 12:
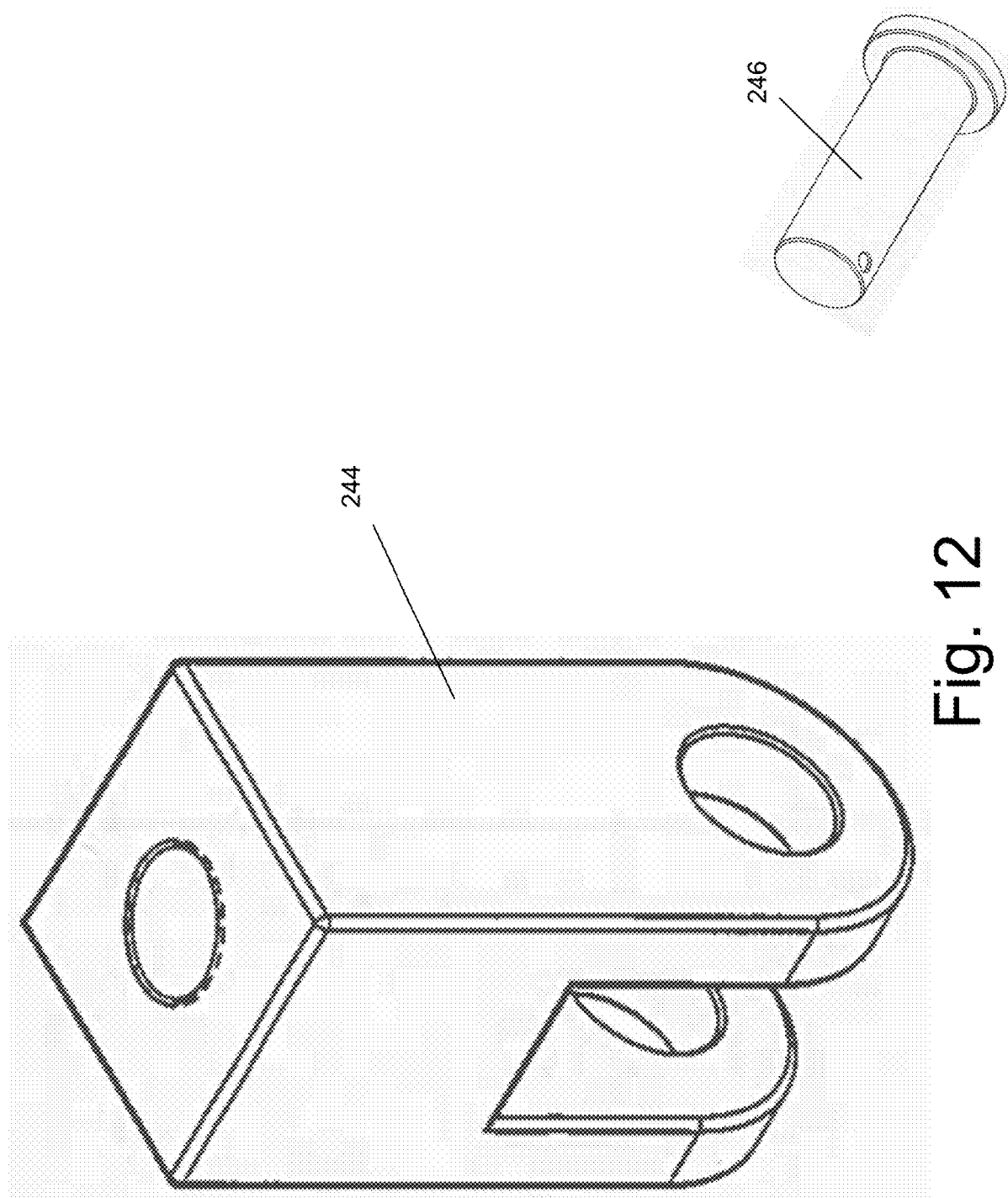
FIG. 12 is an exploded perspective view of a turnbuckle clevis and a turnbuckle clevis pin in the turnbuckle of FIG. 11.

FIG. 12 is an exploded perspective view of a turnbuckle clevis 244 and a turnbuckle clevis pin 246 in the turnbuckle 140 of FIG. 11. The threaded rod 242 of FIG. 11 is attached to the padeye 212 of FIG. 10 via the first turnbuckle clevis 244 by the first turnbuckle clevis pin 246 and is attached to the spectacle plate 150 of FIGS. 2-7 via the second turnbuckle clevis 254 by the second turnbuckle clevis pin 256. FIG. 12 shows the first turnbuckle clevis 244 and the first turnbuckle clevis pin 246, which may be the same as the second turnbuckle clevis 254 and the second turnbuckle clevis pin 256.

Figure 13:
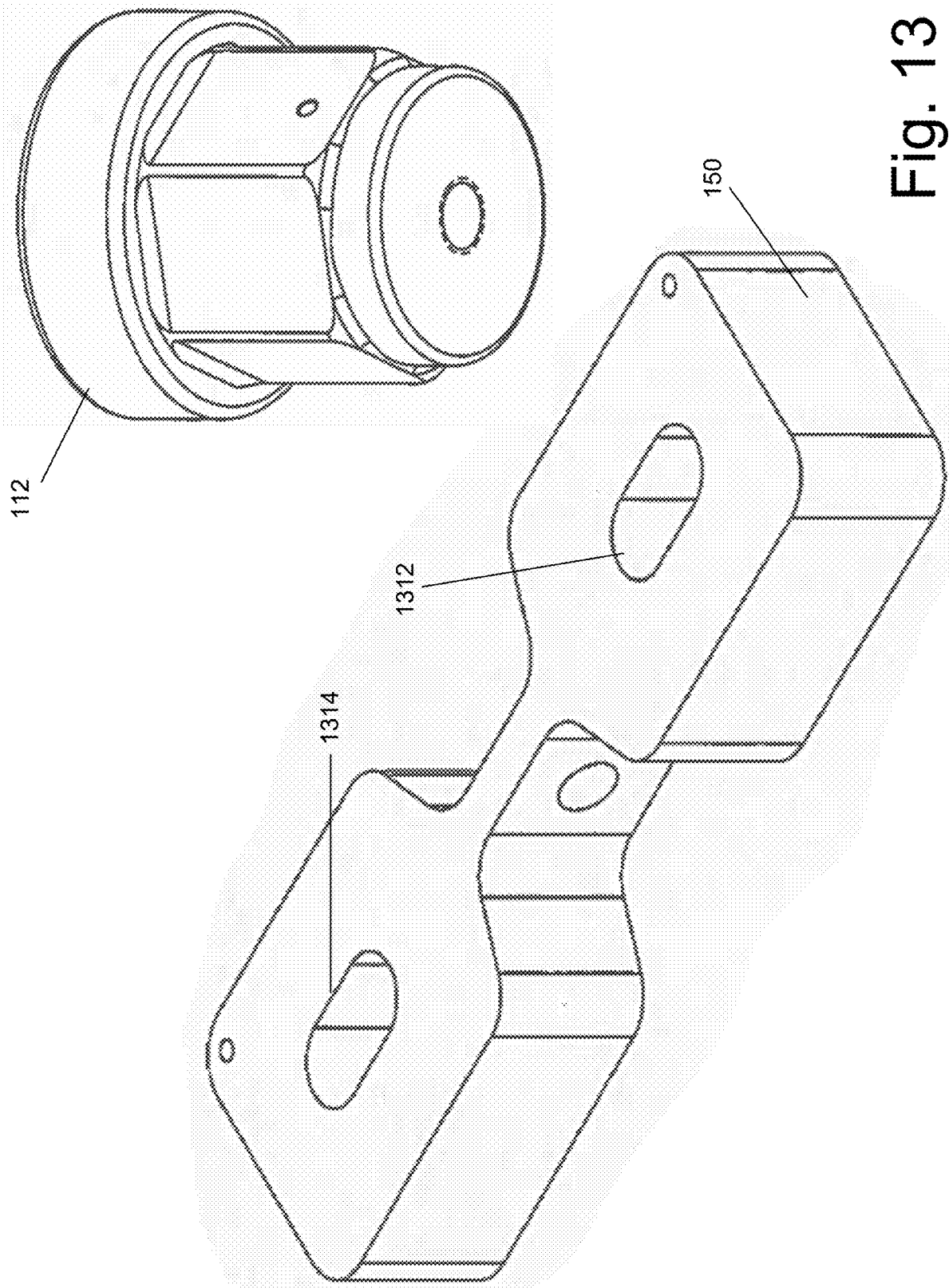
FIG. 13 is an exploded perspective view of a spectacle plate and a mounting nut in the compliant shaft enclosure support system of FIG. 2.

FIG. 13 is an exploded perspective view of a spectacle plate 150 and a mounting nut 112 in the compliant shaft enclosure support system 100 of FIG. 2. The spectacle plate 150 has a pair of elongated spectacle slots or elongated slots 1312, 1314 instead of mere circular holes for receiving a pair of cap screws to attach the mounting nuts 112, 114 to the spectacle plate 150. The spectacle slots 1312, 1314 allow adjustments to vary the distance or spacing between the pair of mounting nuts 112, 114 for a desirable or optimal attachment to the OD box 104. The adjustability of the spacing between the mounting nuts 112, 114, of the position of the padeye collar 130 along the male member 124 of the anti-rotation bar 110, and of the relative positions between the turnbuckle devises 244, 254 of the turnbuckle 140 allows the compliant shaft enclosure support system 100 to be adaptable to variation in dimensions and spacings in the propeller shaft 102 and OD box 104.

FIG. 14A shows a perspective view of the mounting nut 112 of FIG. 13. FIG. 14B shows a top plan view thereof. FIG. 14C shows an elevational view thereof. FIG. 14D shows a cross-sectional view along section A-A thereof. The mounting nut 112 has one open end 1410 for receiving the cap screw 222 attached to the spectacle plate 150 and another open end 1420 for receiving the mounting bolt attached to the OD box 104.

FIG. 15 shows an exploded perspective view of a wire-lockable cap screw 222 and a split lock washer 226 in the compliant shaft enclosure support system 100 of FIG. 2. The wire-lockable cap screw 222 has a wire opening 1510 for receiving a wire. The split lock washer 226 fits the cap screw size.

As best seen in FIGS. 1B and 2, the propeller shaft 102 is driven to rotate around the Z-axis. The anti-rotation bar 110, when attached between the hull 113 and the OD box 104, prevents or at least substantially prevents the OD box 104 from rotating with the propeller shaft 102 around the Z-axis. The compliant shaft enclosure support system 100 is configured to be compliant and to absorb flexing of the propeller shaft 102 or the like.

For example, the first, second, and third connecting mechanisms may provide rotational connections of the anti-rotation bar 110 to the OD box 104 and the hull 113 around the Z-axis or roll axis. The first bar end 106 may have a first dual ring-shaped connection (or first dual mechanical ring connection or first chain connection) with the OD box clevis 105 that is oriented to have a rotational freedom around the Z-axis and allows the first bar end 106 of the anti-rotation bar 110 to rotate relative to the OD box clevis 105 around the Z-axis via the first rotational connection of the first connecting mechanism. The second bar end 116 may also have a second dual ring-shaped connection (or second dual mechanical ring connection or second chain connection) with the hull clevis 115 that is oriented to have a rotational freedom around the Z-axis and allows the second bar end 116 of the anti-rotation bar 110 to rotate relative to the hull clevis 115 around the Z-axis via the second rotational connection of the second connecting mechanism. The padeye 212 may also have a ring-shaped connection with the first turnbuckle clevis 244 of the turnbuckle 140 that is oriented to have a rotational freedom around the Z-axis and allows the padeye 212 on the male member 124 of the anti-rotation bar 110 to rotate relative to the mounting nuts 112, 114 around the Z-axis via the third rotational connection of the third connecting mechanism. These three rotational connections around the Z-axis or roll axis permit limited relative rotations between the OD box 104 and the hull 113 in roll.

Furthermore, the first, second, and third connecting mechanisms may provide rotational connections of the anti-rotation bar 110 to the OD box 104 and the hull 113 around the X-axis or pitch axis. The OD box clevis 105 may have a ring-shaped connection with the first bar end 106 that is oriented to have a rotational freedom around the X-axis and allows the first bar end 106 of the anti-rotation bar 110 to rotate relative to the OD box clevis 105 around the X-axis via the first rotational connection of the first connecting mechanism. The ring-shaped first bar end 106 and the ring-shaped OD box clevis 105 hence form a first dual rotational connection (or first dual mechanical ring connection or first chain connection). The hull clevis 115 may also have a ring-shaped connection with the second bar end 116 that is oriented to have a rotational freedom around the X-axis and allows the second bar end 116 of the anti-rotation bar 110 to rotate relative to the hull clevis 115 around the X-axis via the second rotational connection of the second connecting mechanism. The ring-shaped second bar end 116 and the ring-shaped hull clevis hence form a second dual rotational connection (or second dual mechanical ring connection or second chain connection). The second turnbuckle clevis 254 of the turnbuckle 140 may also have a ring-shaped connection with the spectacle plate 150 that is oriented to have a rotational freedom around the X-axis and allows the padeye 212 of the padeye collar 130 connected to the intermediate location of the male member 124 of the anti-rotation bar 110 to rotate relative to the mounting nuts 112, 114 through the turnbuckle 140 around the X-axis via the third rotational connection of the third connecting mechanism. The ring-shaped first turnbuckle clevis 244 and the ring-shaped second turnbuckle clevis 254 hence form a third dual rotational connection (or third dual mechanical ring connection or third effective chain connection). These three rotational connections around the X-axis or pitch axis permit limited relative rotations between the OD box 104 and the hull 113 in pitch and, in combination with the rotational connections around the Z-axis or roll axis described in the previous paragraph, form three dual rotational connections to permit limited relative rotations between the OD box 104 and the hull 113 around both the X-axis in pitch and Z-axis in roll.

The sliding between the male member 124 and the female member 122 of the anti-rotation bar 110 allows a relatively small amount of translational movement of the compliant shaft enclosure support system 100 along the X-axis (e.g., up to about a few inches). The first and second rotational connections of the anti-rotation bar 110 at the ends to the hull 113 and the OD box 104 around the Z-axis and the X-axis and the third rotational connection of the turnbuckle 140 to the padeye collar 130 allow a relatively small amount of rotational movement of the compliant shaft enclosure support system 100 around the Z-axis or roll axis and the X-axis or pitch axis (e.g., up to about 20 degrees in roll and about 20 degrees in pitch). This allows the compliant shaft enclosure support system 100 to be adaptable to variations in dimensions and spacings in the propeller shaft 102 and OD box 104. As a result, the compliant shaft enclosure support system 100 substantially prevents the OD box 104 from rotating with the propeller shaft 102, while at the same time, provides the compliance to absorb flexing of the propeller shaft 102 with large displacement due to heavy loads (e.g., caused by using the propeller to break ice), thereby minimizing or reducing the chance of damaging the anti-rotation bar 110 and/or other components associated therewith and the need to pause operation of the icebreaker for repairs.

As such, the first bar end 106 of the bar 110 may include a first ring-shaped connector configured to be rotatably connected to the shaft enclosure clevis 105 of the shaft enclosure 104. The first ring-shaped connector of the first bar end 106 may be configured to rotate relative to the shaft enclosure clevis 105 around the roll axis (Z) by less than about 20° and to allow the shaft enclosure clevis 105 to rotate relative to the first ring-shaped connector of the first bar end 106 around the pitch axis (X) by less than about 20°. The second bar end 116 of the bar 110 may include a second ring-shaped connector configured to be rotatably connected to the structure clevis 115 of the structure 113. The second ring-shaped connector of the second bar end 116 may be configured to rotate relative to the structure clevis 115 around the roll axis (Z) by less than about 20° and to allow the structure clevis 115 to rotate relative to the second ring-shaped connector of the second bar end 116 around the pitch axis (X) by less than about 20°.

Furthermore, the link may include a turnbuckle 140 being oriented along the yaw axis (Y) of the shaft 102. The turnbuckle 140 has a first turnbuckle end rotatably connected to the intermediate location of the bar 110 to be rotatable relative to the bar 110 around the roll axis (Z) and a second turnbuckle end configured to be rotatably connected to the shaft enclosure 104 at the third connection to be rotatable relative to the shaft enclosure 104 around the pitch axis (X). The turnbuckle 140 is adjustable in length between the first turnbuckle end and the second turnbuckle end. The link may further include a padeye collar 130 which is connected to the intermediate location of the bar 110 to be slidable along the bar 110 in a direction of the pitch axis (X) and rotatable relative to the bar 110 around the pitch axis (X). The first turnbuckle end may be rotatably connected to the padeye collar 130 to be rotatable relative to the padeye collar 130 around the roll axis (Z) by less than about 20°. The link may further include a spectacle plate 150 which is configured to be mounted to the shaft enclosure 104 at the third connection. The second turnbuckle end may be rotatably connected to the spectacle plate 150 to be rotatable relative to the spectacle plate 150 around the pitch axis (X) by less than about 20°. The spectacle plate 150 may include a pair of elongated spectacle slots 1312, 1314 oriented in a direction along the roll axis (X) to receive a pair of fasteners (e.g., cap screws 222, 224) inserted to fasten the spectacle plate 150 to the shaft enclosure 104 at the third connection. The elongated spectacle slots 1312, 1314 allow the pair of fasteners to slide relative to the spectacle plate 150 along the roll axis (Z) to generate relative sliding motion between the shaft enclosure 104 and the spectacle plate 150 in the direction along the roll axis (Z).

As discussed above, the first connecting mechanism is configured to rotatably connect the first bar end 106 of the bar 110 to the shaft enclosure 104 at a first connection (with shaft enclosure clevis 105) to be rotatable relative to the shaft enclosure 104 around the roll axis (Z) and around the pitch axis (X). The second connecting mechanism is configured to rotatably connect the second bar end 116 of the bar 110 to the structure 113 at a second connection (with structure clevis 115) to be rotatable relative to the structure 113 around the roll axis (Z) and around the pitch axis (X). The third connecting mechanism is configured to rotatably connect an intermediate location of the bar 110 spaced from the first bar end 106 and from the second bar end 116 of the bar 110, to the shaft enclosure 104 at a third connection, to be rotatable relative to the shaft enclosure 104 around the roll axis (Z) and around the pitch axis (X), the third connection being spaced from the first connection.

As a result, the first, second, and third rotational connections provided by the three connecting mechanisms may all contribute to allow the compliant shaft enclosure support system 100 to absorb flexing of the propeller shaft 102 caused by icebreaking or the like, without constraining the propeller shaft 102 and without breaking the anti-rotational bar mechanism 110.

The inventive concepts taught by way of the examples discussed above are amenable to modification, rearrangement, and embodiment in several ways. For example, this invention may be applicable in other environments not involving a flight vest. The shapes of the various parts of the regulator cover may be modified while maintaining their functional aspects. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A compliant shaft enclosure support system for coupling to a shaft enclosure surrounding a shaft which is rotatable relative to a structure around a longitudinal axis of the shaft as a roll axis, the shaft being configured to roll around the roll axis, to pitch around a pitch axis perpendicular to the roll axis, and yaw around a yaw axis perpendicular to both the roll axis and the pitch axis, the compliant shaft enclosure support system comprising:
   a bar having a first longitudinal member slidably coupled to a second longitudinal member, the bar being oriented along the pitch axis of the shaft, the first longitudinal member having a first bar end of the bar configured to be rotatably connected to the shaft enclosure at a first connection to be rotatable relative to the shaft enclosure around the roll axis and around the pitch axis, the second longitudinal member having a second bar end of the bar configured to be rotatably connected to the structure at a second connection to be rotatable relative to the structure around the roll axis and around the pitch axis; and
   a link rotatably connected at a first link end to the bar to be rotatable relative to the bar around the roll axis, at an intermediate location spaced from the first bar end and from the second bar end of the bar, the link configured to be rotatably connected at a second link end to the shaft enclosure at a third connection to be rotatable relative to the shaft enclosure around the pitch axis, the third connection being spaced from the first connection.

2. The compliant shaft enclosure support system of claim 1,
   wherein the first bar end of the bar includes a first ring-shaped connector configured to be rotatably connected to a shaft enclosure clevis of the shaft enclosure at the first connection, the first ring-shaped connector being configured to rotate relative to the shaft enclosure clevis around the roll axis by less than 20° and to allow the shaft enclosure clevis to rotate relative to the first ring-shaped connector around the pitch axis by less than 20°.

3. The compliant shaft enclosure support system of claim 1,
   wherein the second bar end of the bar includes a second ring-shaped connector configured to be rotatably connected to a structure clevis of the structure at the second connection, the second ring-shaped connector being configured to rotate relative to the structure clevis around the roll axis by less than 20° and to allow the structure clevis to rotate relative to the second ring-shaped connector around the pitch axis by less than 20°.

4. The compliant shaft enclosure support system of claim 1,
   wherein the link comprises a turnbuckle being oriented along the yaw axis of the shaft, the turnbuckle having a first turnbuckle end rotatably connected to the intermediate location of the bar to be rotatable relative to the bar around the roll axis and a second turnbuckle end configured to be rotatably connected to the shaft enclosure at the third connection to be rotatable relative to the shaft enclosure around the pitch axis, the turnbuckle being adjustable in length between the first turnbuckle end and the second turnbuckle end.

5. The compliant shaft enclosure support system of claim 4,
   wherein the link further comprises a padeye collar which is connected to the intermediate location of the bar to be slidable along the bar in a direction of the pitch axis and rotatable relative to the bar around the pitch axis, and
   wherein the first turnbuckle end is rotatably connected to the padeye collar to be rotatable relative to the padeye collar around the roll axis by less than 20°.

6. The compliant shaft enclosure support system of claim 4,
   wherein the link further comprises a spectacle plate which is configured to be mounted to the shaft enclosure at the third connection, and
   wherein the second turnbuckle end is rotatably connected to the spectacle plate to be rotatable relative to the spectacle plate around the pitch axis by less than 20°.

7. The compliant shaft enclosure support system of claim 6,
   wherein the spectacle plate includes a pair of elongated slots oriented in a direction along the roll axis to receive a pair of fasteners to fasten the spectacle plate to the shaft enclosure at the third connection, and
   wherein the pair of elongated slots allow the pair of fasteners to slide relative to the spectacle plate along the roll axis to generate relative sliding motion between the shaft enclosure and the spectacle plate in the direction along the roll axis.

8. A compliant shaft enclosure support system for coupling to a shaft enclosure surrounding a shaft which is rotatable relative to a structure around a longitudinal axis of the shaft as a roll axis, the shaft being configured to roll around the roll axis, to pitch around a pitch axis perpendicular to the roll axis, and yaw around a yaw axis perpendicular to both the roll axis and the pitch axis, the compliant shaft enclosure support system comprising:
   a bar having a first longitudinal member slidably coupled to a second longitudinal member, the bar being oriented along the pitch axis of the shaft, the first longitudinal member having a first bar end of the bar, the second longitudinal member having a second bar end of the bar;
   a first connecting mechanism configured to rotatably connect the first bar end of the bar to the shaft enclosure at a first connection to be rotatable relative to the shaft enclosure around the roll axis and around the pitch axis;
   a second connecting mechanism configured to rotatably connect the second bar end of the bar to the structure at a second connection to be rotatable relative to the structure around the roll axis and around the pitch axis; and
   a third connecting mechanism configured to rotatably connect an intermediate location of the bar spaced from the first bar end and from the second bar end of the bar, to the shaft enclosure at a third connection, to be rotatable relative to the shaft enclosure around the roll axis and around the pitch axis, the third connection being spaced from the first connection.

9. The compliant shaft enclosure support system of claim 8,
   wherein the first connecting mechanism comprises a first ring-shaped connector attached to the first bar end of the bar, the first ring-shaped connector configured to be rotatably connected to a shaft enclosure clevis of the shaft enclosure at the first connection, the first ring-shaped connector being configured to rotate relative to the shaft enclosure clevis around the roll axis by less than 20° and to allow the shaft enclosure clevis to rotate relative to the first ring-shaped connector around the pitch axis by less than 20°.

10. The compliant shaft enclosure support system of claim 8,
wherein the second connecting mechanism comprises a second ring-shaped connector attached to the second bar end of the bar, the second ring-shaped connector configured to be rotatably connected to a structure clevis of the structure at the second connection, the second ring-shaped connector being configured to rotate relative to the structure clevis around the roll axis by less than 20° and to allow the structure clevis to rotate relative to the second ring-shaped connector around the pitch axis by less than 20°.

11. The compliant shaft enclosure support system of claim 8,
wherein the third connecting mechanism comprises a turnbuckle being oriented along the yaw axis of the shaft, the turnbuckle having a first turnbuckle end rotatably connected to the intermediate location of the bar to be rotatable relative to the bar around the roll axis and a second turnbuckle end configured to be rotatably connected to the shaft enclosure at the third connection to be rotatable relative to the shaft enclosure around the pitch axis, the turnbuckle being adjustable in length.

12. The compliant shaft enclosure support system of claim 11, wherein
the third connecting mechanism further comprises:
a padeye collar which is connected to the intermediate location of the bar to be slidable along the bar in a direction of the pitch axis and rotatable relative to the bar around the pitch axis, the first turnbuckle end being rotatably connected to the padeye collar to be rotatable around the roll axis by less than 20°.

13. The compliant shaft enclosure support system of claim 11, wherein
the third connecting mechanism further comprises:
a spectacle plate which is to be mounted to the shaft enclosure at the third connection, the second turnbuckle end being rotatably connected to the spectacle plate to be rotatable relative to the spectacle plate around the pitch axis by less than 20°,
wherein the spectacle plate includes a pair of elongated slots oriented in a direction along the roll axis to receive a pair of fasteners to fasten the spectacle plate to the shaft enclosure at the third connection, and
wherein the pair of elongated slots allow the pair of fasteners to slide relative to the spectacle plate along the roll axis to generate relative sliding motion between the shaft enclosure and the spectacle plate in the direction along the roll axis.

14. A method of for coupling to a shaft enclosure surrounding a shaft which is rotatable relative to a structure around a longitudinal axis of the shaft as a roll axis, the shaft being configured to roll around the roll axis, to pitch around a pitch axis perpendicular to the roll axis, and yaw around a yaw axis perpendicular to both the roll axis and the pitch axis, the method comprising:
rotatably connecting a first bar end of a bar to the shaft enclosure at a first connection to be rotatable relative to the shaft enclosure around the roll axis and around the pitch axis;
rotatably connecting a second bar end of the bar to the structure at a second connection to be rotatable relative to the structure around the roll axis and around the pitch axis, the bar having a first longitudinal member slidably coupled to a second longitudinal member, the bar being oriented along the pitch axis, the first longitudinal member having the first bar end of the bar, the second longitudinal member having the second bar end of the bar; and
rotatably connecting an intermediate location of the bar spaced from the first bar end and from the second bar end of the bar, to the shaft enclosure at a third connection, to be rotatable relative to the shaft enclosure around the roll axis and around the pitch axis, the third connection being spaced from the first connection.

15. The method of claim 14, further comprising:
attaching a first ring-shaped connector to the first bar end of the bar; and
connecting the first ring-shaped connector to a shaft enclosure clevis of the shaft enclosure at the first connection, the first ring-shaped connector being configured to rotate relative to the shaft enclosure clevis around the roll axis by less than 20° and to allow the shaft enclosure clevis to rotate relative to the first ring-shaped connector around the pitch axis by less than 20°.

16. The method of claim 14, further comprising:
attaching a second ring-shaped connector to the second bar end of the bar; and
connecting the second ring-shaped connector to a structure clevis of the structure at the second connection, the second ring-shaped connector being oriented to rotate relative to the structure clevis around the roll axis by less than 20° and to allow the structure clevis to rotate relative to the second ring-shaped connector around the pitch axis by less than 20°.

17. The method of claim 14, wherein rotatably connecting the intermediate location of the bar to the shaft enclosure at the third connection comprises:
rotatably connecting a first turnbuckle end of a turnbuckle to the intermediate location of the bar to be rotatable relative to the bar around the roll axis; and
rotatably connecting a second turnbuckle end of the turnbuckle to the shaft enclosure at the third connection to be rotatable relative to the shaft enclosure around the pitch axis, the turnbuckle being adjustable in length and being oriented along the yaw axis of the shaft.

18. The method of claim 17, wherein rotatably connecting the first turnbuckle end of the turnbuckle to the intermediate location of the bar comprises:
connecting a padeye collar to the intermediate location of the bar to be slidable along the bar in a direction of the pitch axis and rotatable relative to the bar around the pitch axis;
rotatably connecting the first turnbuckle end to the padeye collar to be rotatable around the roll axis by less than 20°;
adjusting a length of the turnbuckle between the first turnbuckle end and the second turnbuckle end to provide an adjusted length;
adjusting the intermediate location of the bar to which the padeye collar is connected to provide an adjusted intermediate location; and
affixing the padeye collar to the bar at the adjusted intermediate location of the bar at the adjusted length of the turnbuckle.

19. The method of claim 17, wherein connecting the second turnbuckle end of the turnbuckle to the shaft enclosure at the third connection comprises:

mounting a spectacle plate to the shaft enclosure at the third connection; and rotatably connecting the second turnbuckle end to the spectacle plate to be rotatable relative to the spectacle plate around the pitch axis by less than 20°.

20. The method of claim 19, wherein the spectacle plate includes a pair of elongated slots oriented in a direction along the roll axis and wherein connecting the second turnbuckle end of the turnbuckle to the shaft enclosure at the third connection comprises:

inserting a pair of fasteners through the pair of elongated slots to fasten the spectacle plate to the shaft enclosure at the third connection, wherein the pair of elongated slots allow the pair of fasteners to slide relative to the spectacle plate along the roll axis to generate relative sliding motion between the shaft enclosure and the spectacle plate in the direction along the roll axis.

* * * * *